United States Patent
Onoe

(10) Patent No.: US 8,213,277 B2
(45) Date of Patent: Jul. 3, 2012

(54) SERVO CONTROLLER AND OPTICAL DISK DEVICE

(75) Inventor: Shinsuke Onoe, Fujisawa (JP)

(73) Assignees: Hitachi-LG Data Storage, Inc., Tokyo (JP); Hitachi Consumer Electronics Co., Ltd., Tokyo (JP)

(*) Notice: Subject to any disclaimer, the term of this patent is extended or adjusted under 35 U.S.C. 154(b) by 0 days.

(21) Appl. No.: 12/769,439

(22) Filed: Apr. 28, 2010

(65) Prior Publication Data

US 2011/0116351 A1 May 19, 2011

(30) Foreign Application Priority Data

Nov. 13, 2009 (JP) .................................. 2009-259431

(51) Int. Cl.
*G11B 7/00* (2006.01)
(52) U.S. Cl. ................ 369/44.32; 369/44.35; 369/53.13
(58) Field of Classification Search .................. None
See application file for complete search history.

(56) References Cited

U.S. PATENT DOCUMENTS

| 6,339,566 B1* | 1/2002 | Kishimoto et al. ........ 369/44.28 |
| 2002/0001266 A1* | 1/2002 | Tateishi et al. ............. 369/47.26 |
| 2007/0183284 A1 | 8/2007 | Nishimura et al. |

FOREIGN PATENT DOCUMENTS

| EP | 0062464 A2 | 13/1982 |
| JP | 2007-207390 A | 8/1916 |
| JP | 8 077589 A | 3/1996 |
| JP | 08-077589 A | 3/1996 |
| JP | 2003 067951 A | 3/2003 |
| JP | 2008 165897 A | 7/2008 |

OTHER PUBLICATIONS

European Application No. 10250829.8, European Search Report dated Jan. 14, 2011, 8 pages.

* cited by examiner

*Primary Examiner* — Paul Huber
(74) *Attorney, Agent, or Firm* — Kilpatrick Townsend & Stockton LLP

(57) ABSTRACT

In a servo controller and an optical disk device (FIG. 4), the following performance for disturbance is improved. By disposing a characteristic change section to change a characteristic to improve the following performance for disturbance, the disturbance is detected by use of a signal in a stage after the characteristic change section.

15 Claims, 25 Drawing Sheets

SERVO CONTROLLER AND OPTICAL DISK DEVICE

INCORPORATION BY REFERENCE

The present application claims priority from Japanese application JP2009-259431 filed on Nov. 13, 2009, the content of which is hereby incorporated by reference into this application.

BACKGROUND OF THE INVENTION

The present invention relates to a servo controller and an optical disk device to record or to reproduce information on an optical disk.

In an optical disk device employing an optical disk, periodic external disturbance due to rotation of the optical disk is a factor to cause a servo following capability. Methods to improve the following performance to follow such periodic disturbance are described, for example, in JP-A-8-77589 and JP-A-2007-207390.

According to JP-A-8-77589, for example, in the description of paragraph [0056], track deviation obtained for each of several preceding disk rotations is stored to be compared with the present track deviation. As a result of the comparison, a correlation is detected between the tracking error of the track currently being followed and a mean value of tracking errors for the several tracks. Based on the correlation, quantity of attenuation is changed in the feedforward loop of a learning compensation section and the loop gain of a tracking control system is changed, to thereby change the degree of learning and the control band according to the track correlation.

As periodic disturbance components which appear during rotation of an optical disk, a component "deviation" is known in addition to an eccentricity component and a plane fluctuation component. According to JP-A-2007-207390, in an optical disk including a guide groove, a groove-shaped defective section exists due to deterioration of a disk stumper and/or disk forming defect depending on cases. When the disk rotates at a high operation speed, a signal reflected from the groove contains a noise component inherent to a broad band particularly in an outer circumferential section of the disk. JP-A-2007-207390 also describes a technique to detect a deviation of the guide groove of the optical disk by use of quantity of variation in an obtained focusing or tracking error signal.

In the servo error signal employed in the control operation of the focusing system and/or the tracking system, a component which the servo system cannot suppress appears as a residual error. Hence, when an optical disk has the plane fluctuation and/or the eccentricity, the servo error signal contains a signal variation component of the rotary period. Similarly, when a track on an optical disk has a partial distortion (to be referred to as a deviation hereinbelow), the signal variation component is observed as a high-frequency signal variation in the servo error signal.

FIG. 35 graphically shows a servo error signal when a deviation is passed. $V_{ref}$ indicates a reference level of the servo error signal. A high-frequency signal variation component observed in the servo error signal when a deviation is passed will be referred to as a deviation component hereinbelow. The deviation component corresponds to waveforms A in the graph of FIG. 35. $T_{rot}$ represents a rotary period, and the servo error signal contains a component having the period $T_{rot}$. This component is an eccentric component in the tracking servo system and a plane fluctuation component in the focusing servo system.

As FIG. 35 shows, the deviation component takes place at timing synchronized with the rotary period. This results in substantially an equal signal variation waveform at an interval of the rotary period. The signal deviation is a local distortion due to a production process of the disk and hence appears at a particular angle during the disk rotation. Additionally, a track adjacent to the track under consideration is also distorted in almost the same contour in the focusing direction and the tracking direction.

The deviation is due to defect in the track shape on a recording surface of an optical disk and hence particularly exists in a local range of its radius on the recording surface.

FIG. 36A schematically shows a servo error signal when a deviation is passed. In this graph, the abscissa represents time. On the optical disk, tracks are formed in a direction from an inner circumference to an outer circumference. Hence, the abscissa of FIG. 36A may also be regarded as a radial position r of a track currently being followed, relative to a center of the optical disk. FIGS. 36A and 36B show a situation in which a deviation exists in an area ranging from radius $r_1$ to radius $r_2$.

The present inventor has detected characteristics of deviation component described below. The deviation component appears at a first radial position ($r_1$ in FIG. 36A) and then becomes gradually greater in amplitude. And the amplitude becomes gradually smaller toward a second radial position ($r_2$ in FIG. 36A) and no deviation component exists in an area of a radius more than $r_2$. The range of radius r ($r_1 \leq r \leq r_2$) in which the deviation exists will be referred to as a deviation area hereinbelow.

The deviation component is lower in frequency than disturbance components such as those of a defect and a scratch. Hence, for an effective following operation, it is efficient to suppress the deviation component by increasing the servo gain. On the other hand, the disturbance components such as those of a defect and a scratch have a high frequency. Hence, it is efficient to reduce the servo response by lowering the servo gain not to forcibly conduct the following operation.

The deviation, eccentric, and plane fluctuation components have signal waveforms synchronized with the rotary period and can be represented through Fourier transform as a sum of a rotary period component and its higher-order components. Therefore, by suppressing these components through iterative learning control, it is possible to improve performance of the following operation when a deviation is passed.

For the tracks on an optical disk recording surface as objects of the following operation of the optical disk device, the optical disk standards prescribe physical precision in the focusing and tracking directions. For an optical disk conforming to the standards, it is guaranteed that the components described above can be suppressed by using a servo characteristic prescribed by the standards. However, optical disks having a large deviation, i.e., optical disks other than those conforming to the standards may actually be put to the market. To appropriately cope with such optical disks, the optical disk device needs to have servo performance of the following operation which is higher in efficiency than that prescribed by the standards. On the other hand, there also exists a need in which the period of time for the recording and reproducing operations is reduced by coping with the recording and reproducing operations at a high operation speed equal to or more than the operation speed prescribed by the standards for an optical disk conforming to predetermined standards. In this situation, the following performance which is higher than that assumed by the standards is also required.

In the situation in which the following performance higher than that assumed by the standards is required as the servo performance of the optical disk device, there occurs an event in which the suppression gain is particularly insufficient for the deviation component. In a worst case, the following operation cannot be appropriately carried out and the servo operation fails. Even if the servo operation does not fail, since the following error becomes larger when a deviation is passed, the recording and reproducing performance is deteriorated. Therefore, it is required to improve the following performance for the deviation.

To remove the problem, it is required to change the servo characteristic to improve the suppression performance for the deviation component. However, in general, when the suppression performance is improved for a particular frequency range, the following performance is disadvantageously deteriorated for other frequency ranges.

To improve the suppression performance for the deviation component, the gain of the servo characteristic is uniformly increased, for example, as shown in FIG. 37. However, in this case, the gain margin lowers in the frequency indicated by A in FIG. 37. Hence, the following performance is deteriorated for the disturbance component higher in the frequency than the servo band. Hence, it is feared that the following performance is deteriorated when a defect or a scratch is passed.

The inventor has recognized a fact as below. It is favorable in consideration of the aspect of the deviation shown in FIG. 36A that by detecting a local radial area (deviation area) in which a deviation is present, the servo characteristic is changed only in the deviation area.

For the operation, it is first required to detect the starting point of the deviation area, and then the servo characteristic is changed to increase the degree of suppression for the deviation component. In a state in which a track is being followed by use of a servo characteristic with the increased degree of suppression for the deviation component, it is required that when an end edge of the deviation area is passed, the end edge of the deviation area is detected to restore the servo characteristic to a steady-state characteristic.

However, in the prior art, the deviation is detected on the basis of the servo error signal. Hence, although the first point of the deviation area can be detected, it is not possible to detect the end point of the deviation area.

For example, JP-A-2007-207390 describes a configuration in which the deviation is detected according to the focusing or tracking error signal. When the deviation is detected on the basis of the servo error signal to improve the suppression performance for the deviation component as in the detection method described above, a problem takes place. The problem will be described by referring to the waveforms shown in FIGS. 36A and 36B.

FIG. 36A shows a servo error signal in an operation to follow a track in a deviation area by use of a steady-state characteristic. When the steady-state characteristic is used, the deviation component of the serve error signal has large amplitude in the deviation area. Hence, it is possible to easily detect the deviation in the method described above. Therefore, as FIGS. 36A and 36B show, when a deviation area is passed during the track following operation, although the deviation area cannot be immediately detected at the first point thereof since the amplitude of the deviation component is small, the deviation can be detected when the amplitude becomes greater, for example, a value corresponding to the radius ($r_d$ in FIG. 36A) exceeding a predetermined voltage level ($V_t$ in FIG. 36A). Hence, the first point of the deviation area can be detected for radius $r_d$.

FIG. 36B shows a servo error signal in an operation to follow a track in the same deviation area as that of FIG. 36A. In the operation, the first position of the deviation area is detected at radius $r_d$ and a servo characteristic resultant from the uniform increase in the servo gain is employed in a range represented as $r \geq r_d$.

By uniformly increasing the gain of the servo characteristic as above, the deviation component is suppressed to lower the track following error. However, the deviation component is reduced in the servo error signal. In this situation, whether or not a deviation is present in the track being currently followed cannot be determined. That is, since the deviation component is too small, the area actually including the deviation cannot be detected in the method described above.

This leads to a problem in which even the end edge of the deviation area is passed, the event of the passing of the end edge cannot be detected. It is difficult to restore to the steady-state characteristic in response to the end edge of the deviation area because of the increased servo gain.

By dividing the surface of an optical disk into predetermined areas according to the radius of the disk, it is possible to restore the servo characteristic to the steady-state characteristic at timing when the operation moves from a first area to a second area. However, this method is not available if the deviation area exists in two adjacent areas over a boundary between the two areas. In this situation, if the servo characteristic is restored to the steady-state characteristic at timing at which the operation moves from the first area to the second area, the servo control fails in a worst case when the deviation is passed. In a recording operation, this results in recording failure.

As a method to improve the suppression characteristic for the deviation component, a method to uniformly increase the gain of the servo characteristic has been described. Next, description will be given of a method employing iterative learning control.

For this purpose, a method to change the learning degree of the iterative learning control is known. As described in JP-A-2007-207390, the learning degree of the iterative learning control can be set, for example, by changing the value (to be represented by K hereinbelow) of the variable gain of the iterative learning control system. For the depression of the deviation as an object of the present invention, it is only required to increase the value K of the variable gain of the iterative learning control system in the deviation area.

However, also in the case in which the deviation is suppressed by increasing the learning degree of the iterative learning control, the deviation component is suppressed and the following error is reduced, but the deviation component becomes smaller in the servo error signal as in the case shown in FIG. 36B. Therefore, it is similarly difficult to restore the characteristic from the characteristic in which the servo gain is increased after detection of the end edge of the deviation area to the steady-state characteristic.

According to the prior art, it is not clarified whether or not a condition (such as a threshold value) to detect the deviation is changed, when the variable gain is changed, before and after the variable gain change. Moreover, the signal and the process to be employed to correctly detect the deviation area when the variable gain is changed are not clarified.

Hence, in the prior art, there exists a problem in which it is not possible to change the servo characteristic only in the deviation area by detecting a deviation area.

SUMMARY OF THE INVENTION

It is therefore an object of the present invention to improve the following performance of a servo controller and to improve the track following performance of an optical disk device.

The object of the present invention is achieved by a configuration according to the claims. For example, by disposing a characteristic change section which changes a characteristic to improve a following characteristic for disturbance, the disturbance is detected by use of a signal in a stage after a state of an output signal from the characteristic change section, to thereby change the characteristic of the characteristic change section.

According to the present invention, it is possible to improve the following performance of a servo controller and to improve the track following performance of an optical disk device.

Other objects, features and advantages of the invention will become apparent from the following description of the embodiments of the invention taken in conjunction with the accompanying drawings.

DESCRIPTION OF THE EMBODIMENTS

Figure 1:
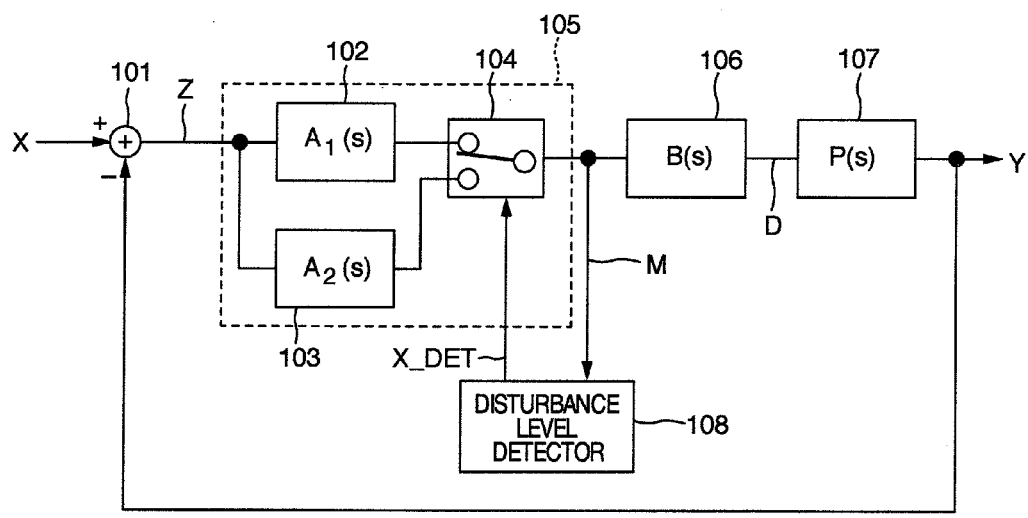
FIG. 1 is a block diagram for explaining the theory of the present invention in a general feedback control system.

Description will now be given of embodiments. In the present specification, iterative learning control indicates control in which, for example, an input signal has a repetitive waveform. Specifically, the iterative learning control indicates a control processing method in which when an input signal to a control system repeatedly includes almost the one and the same waveform, the control deviation up to the previous repetition of the waveform is reflected for each repetition in the control operation at the present point. In this specification, the iterative learning control may also be replaced by learning control.

First Embodiment

The present invention is applicable not only to the optical disk device, but also to any apparatus including a feedback control system. First, description will be given of the theory of the present invention by referring to a block diagram of a feedback control system shown in FIG. 1.

A variable X is disturbance inputted to a servo system. It is assumed in this system that only X is the disturbance to the feedback control system.

Reference numeral 101 is a subtractor. The subtractor 101 calculates the difference between the disturbance X and quantity of operation Y of a control object 106, which will be described later, and produces a following error Z.

Reference numeral 102 indicates a first control element. The first control element 102 compensates the gain or phase for the following error Z. The transfer function of the first control element 102 is represented as $A_1(s)$.

Reference numeral 103 indicates a second control element. The second control element 103 compensates the gain or phase for the following error Z. The transfer function of the first control element 103 is represented as $A_2(s)$.

Reference numeral 104 indicates a selector. The selector 104 receives, as input signals thereto, an output signal from the first control element 102 and an output signal from the first control element 103. The selector 104 operates based on an output signal, i.e., external level detection information X_DET from a disturbance level detector 108, which will be described later. If it is determined that the disturbance level is low, the selector 104 selects the output signal from the first control element 102 and outputs the selected signal. If it is determined that the disturbance level is high, the selector 104 selects the output signal from the second control element 103 and outputs the selected signal. The output signal from the selector 104 is represented as a variable M.

Reference numeral 105 indicates a block enclosed by a broken line in FIG. 1 and includes the first and second control elements 102 and 103 and the selector 104. The block is referred to as a characteristic changeover section.

Reference numeral 106 indicates a third control element, which compensates the gain or phase for a signal M. The transfer function of the third control element 106 is represented as B(s).

Reference numeral 107 indicates a control object. The control object 107 is driven by a control quantity signal D produced from the third control element 106. The transfer function of the third control object 107 is represented as P(s). Quantity of operation thus driven is represented as a variable Y.

Reference numeral 108 indicates a disturbance level detector. The detector 108 receives the signal M and produces the disturbance level detection information X_DET.

In the feedback control system of FIG. 1, the transfer function of the control elements is a serial connection of the character changeover section 105 and the third control element 106. According to the selection state of the selector 104, the transfer function is $A_1(s) \cdot B(s)$ or $A_2(s) \cdot B(s)$. In this way, the control elements provide two transfer functions between which a changeover can be conducted by the selector 104.

Referring now to the servo gain graph of FIG. 2, description will be given of an open-loop transfer function of the feedback control system shown in FIG. 1.

Figure 2:
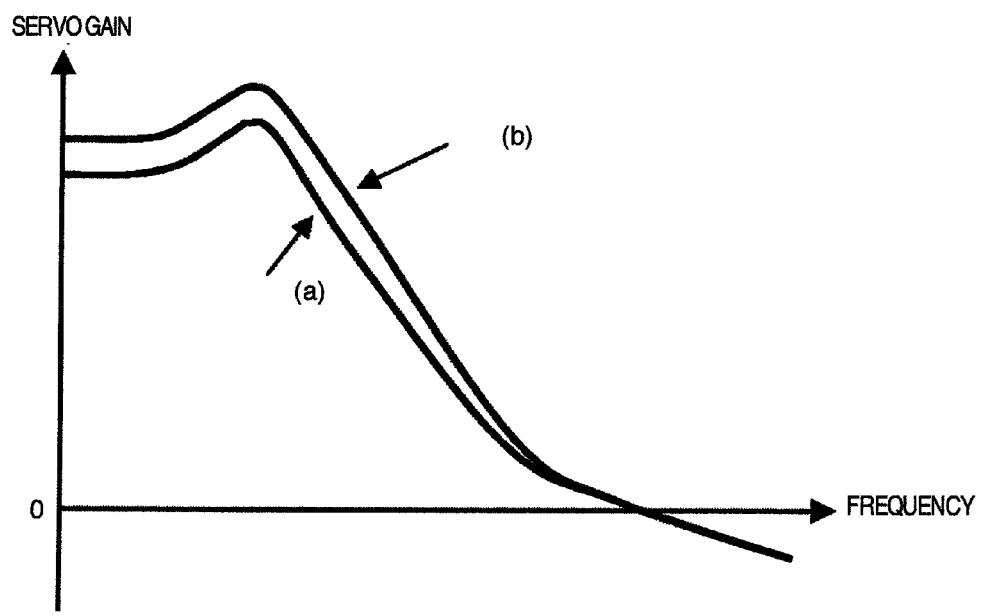
FIG. 2 is a graph of gain of an open-loop transfer function in a feedback control system.

In the description below, the state in which the selector 104 has selected the output signal from the first control element 102 is referred to as a steady state. In this state, the characteristic of the control element is referred to as a steady-state characteristic. The open-loop transfer function in the steady state is represented as $$A_1(s) \cdot B(s) \cdot P(s) \tag{1}$$

and has, for example, a gain characteristic of a curve (a) shown in FIG. 2.

The state in which the selector 104 has selected the output signal from the second control element 103 is referred to as a characteristic changeover state. In this state, the characteristic of the control element is referred to as a changeover characteristic. The open-loop transfer function in the characteristic changeover state is represented as $$A_2(s) \cdot B(s) \cdot P(s) \tag{2}$$

and has, for example, a gain characteristic of a curve (b) shown in FIG. 2. For simplicity, the band of the open-loop transfer function is commonly used. In the characteristic changeover state, the gain characteristic is as below. For a frequency lower than the band of the open-loop transfer function, the gain (the curve (a) of FIG. 2) of the transfer function is more than the gain (the curve (b) of FIG. 2) obtained in the steady state.

That is, for a frequency lower than the band of the open-loop transfer function, it is assumed that a relationship represented as $$A_1(S) < A_2(S) \tag{3}$$

holds. $A_1(s)$ and $A_2(s)$ take a gain value equal to or more than 0 decibel (dB) in a low-frequency band. In the present specification, the low-frequency band indicates a frequency band which is lower in the frequency than the band of the open-loop transfer function.

The transfer function of the character changeover section 105 is represented as A(s) in the description below. The open-loop transfer function G(s) is expressed as $$G(s) = A(s) \cdot B(s) \cdot P(s)$$

and the sensitivity function S(s) is represented as $$S(s) = \frac{1}{1 + A(s) \cdot B(s) \cdot P(s)} = \frac{1}{1 + G(s)} \tag{5}$$

The sensitivity function S(s) indicates a transfer function from the disturbance X to the following error Z.

The gain of the open-loop transfer function G(s) takes a large value in the low-frequency band. When the gain of G(s) can be regarded as sufficiently larger than one, the gain of the sensitivity function S(s) is approximately represented as $$|S(s)| = \left| \frac{1}{1 + G(s)} \right| \approx \frac{1}{|G(s)|} \tag{6}$$

Since $A_1(s) < k(s)$ in the low-frequency band, the gain of the sensitivity function S(s) takes a smaller value in the characteristic changeover state than in the steady state. That is, in the characteristic changeover state, the disturbance component of the following error Z is much more depressed to a small value. This improves the insufficient suppression for the disturbance X to resultantly improve the following performance.

Description will now be given of a situation in which when the steady-state characteristic is employed for the control element characteristic, the suppression for the disturbance X is insufficient to resultantly increase the following error. Primary frequency components contained in the disturbance X are lower in the frequency than the band of the open-loop transfer function represented by expression (1). Hence, it will be efficient in this situation to increase the degree of suppression.

It will be ideal to fully suppress the disturbance X by use of the steady-state characteristic. However, in general, when the degree of suppression is increased for disturbance of a particular frequency, the suppression is lowered for disturbance of the other frequencies. Hence, in the steady state, it is desirable to employ a characteristic (the steady-state characteristic) appropriate for all frequency bands. In a period of time in which the suppression for the disturbance X is insufficient by use of the steady-state characteristic, it is favorable to use a characteristic (the changeover characteristic) having a higher suppression degree for the low-frequency component. That is, after the steady-state characteristic is changed to the characteristic having a higher suppression degree, when the disturbance X inputted to the feedback control system becomes smaller, it is desirable to restore the characteristic to the steady-state characteristic.

For this purpose, it is required to detect a situation wherein the disturbance X being inputted to the feedback control system has a level for which the suppression for the disturbance X by use of the steady-state characteristic as the control element characteristic is insufficient. If it is possible to determine whether or not the disturbance suppression by the steady-state characteristic is insufficient, the following error can be reduced. That is, in the period of time in which the situation is detected, the selector 104 selects the second control element 103 to increase the degree of suppression for the disturbance X.

Description will next be given of an operation to detect the level of the disturbance X being inputted to the feedback control system, the level causing the insufficient suppression for the disturbance X by use of the steady-state characteristic as the control element characteristic.

When the following error Z is monitored, the disturbance X is suppressed in the characteristic changeover state as described above. Hence, in the characteristic changeover state, it is difficult to detect whether or not the disturbance X being inputted to the feedback control system has a level which causes the insufficient suppression of the disturbance by use of the steady-state characteristic.

Consider the signal M outputted from the selector 104, i.e., a signal immediately after the characteristic change section. The transfer function from the disturbance X to the signal M is expressed as $$\frac{M(s)}{X(s)} = \frac{A(s)}{1 + A(s) \cdot B(s) \cdot P(s)} \quad (7)$$

When the gain of the open-loop transfer function of expression (1) can be regarded fully larger than one, the gain of the transfer function of expression (7) is approximately represented as $$\left|\frac{A(s)}{1 + A(s) \cdot B(s) \cdot P(s)}\right| = \frac{|A(s)|}{|1 + A(s) \cdot B(s) \cdot P(s)|} \approx \frac{|A(s)|}{|A(s) \cdot B(s) \cdot P(s)|} = \frac{1}{|B(s) \cdot P(s)|} \quad (8)$$

In expression (8), A(s) has a characteristic of $A_1(s)$ or $A_2(s)$. Since $A_1(s)$ is less than $A_2(s)$ in the low-frequency band, the gain of the open-loop transfer function takes a smaller value in the steady state than in the characteristic changeover state. Assume that the gain of the open-loop transfer function in the steady state takes a value sufficiently larger than one. However, even for the gain, when the suppression degree becomes further insufficient, the input disturbance X becomes larger.

When the gain of the open-loop transfer function in the steady state takes a value sufficiently larger than one for the frequency of the disturbance X, the transfer function from the disturbance X to the signal M can be approximated by expression (8) in the steady and character changeover states.

Expression (8) takes a value which is independent of A(s) and which is determined only by B(s) and P(s). It is hence possible to employ a configuration in which the amplitude of the disturbance X component of the signal M takes substantially an equal amplitude value regardless of the selection state of the selector 104.

Figure 3:
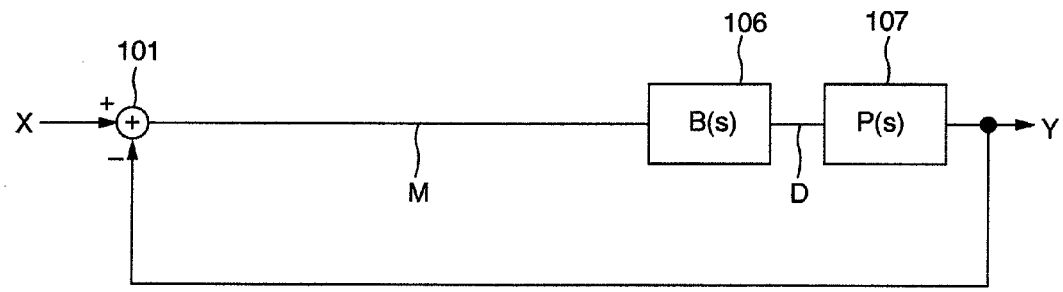
FIG. 3 is a block diagram showing an example of a general feedback control system.

Consider a situation in which the transfer function of the characteristic change section 105 has a characteristic of "gain=0 dB" and "phase=0°", namely, a situation of a feedback control system shown in FIG. 3. In FIG. 3, the constituent components as those of FIG. 1 are assigned with the same reference numeral.

In the feedback control system of FIG. 3, the transfer function from the disturbance X to the signal M is expressed as $$\frac{1}{|1 + B(s) \cdot P(s)|} \quad (9)$$

When the gain of the transfer function B(s)·P(s) can be regarded as sufficiently larger than one, expression (9) takes a value substantially equal to that of expression (8).

It is assumed in this situation that the suppression degree is insufficient for the frequency of the disturbance X in the steady state in which the transfer function of the characteristic change section 105 is $A_1(s)$ in the feedback control system shown in FIG. 1. Since $A_1(s) > 1$, also for the signal M of FIG. 3, the component of the disturbance X is not fully suppressed and remains with sufficient amplitude. Hence, for the frequency of the disturbance X, expression (9) leads to a large gain value capable of confirming the disturbance component by use of the signal M.

Hence, expression (7) also takes a value large enough to confirm the disturbance component in the signal M. That is, regardless of the characteristics of $A_1(s)$ and $A_2(s)$ in the feedback control system of FIG. 1, the disturbance X component with sufficient amplitude is not suppressed and remains in the signal M.

Therefore, as shown in FIG. 1, when the disturbance detector 108 receives the output signal M from the characteristic change section 105 to monitor the voltage level of the signal M, the amplitude value of the disturbance X component in the characteristic changeover state is almost equal to that in the steady state. Hence, it is possible even in the characteristic changeover state to detect whether or not the voltage level leads to insufficient suppression of the disturbance X by use of the steady-state characteristic as the control element characteristic.

In the operation, the detection threshold value for the detection may be fixed regardless of the selection state of the selector 104. Hence, in an apparatus including a feedback control system configured as in the first embodiment, it is possible to simplify circuits, and the production cost is advantageously lowered.

As above, according to the finding of the present inventor, there can be provided a configuration in which in any selection state of the selector 104, the disturbance X component contained in the input signal M to the disturbance level detector 108 takes substantially an equal amplitude value and the amplitude value is sufficient for the operation.

In the description, for the frequency of the disturbance X, the gain for the steady-state characteristic and that of the transfer function B(s)·P(s) are sufficiently larger than one. In this situation, the detection is possible by use of a common voltage threshold value regardless of the state of the selector 104 which selects the first control element 102 or the second control element 103.

However, even in any case other than the case in which the gain for the steady-state characteristic or that of the transfer function B(s)·P(s) is sufficiently larger than one, when the disturbance X component with sufficient amplitude is not suppressed and remains in the signal M, the operation can be carried out, for example, by changing the detection threshold value of the disturbance detector 108 according to the selection state of the selector 104.

Next, referring to the drawings, description will be given of an embodiment in which the theory described above is applied to an optical disk device. The optical disk device of the embodiment is capable of conducting the tracking control and the focusing control. Description will now be given of the tracking control as an example.

Figure 4:
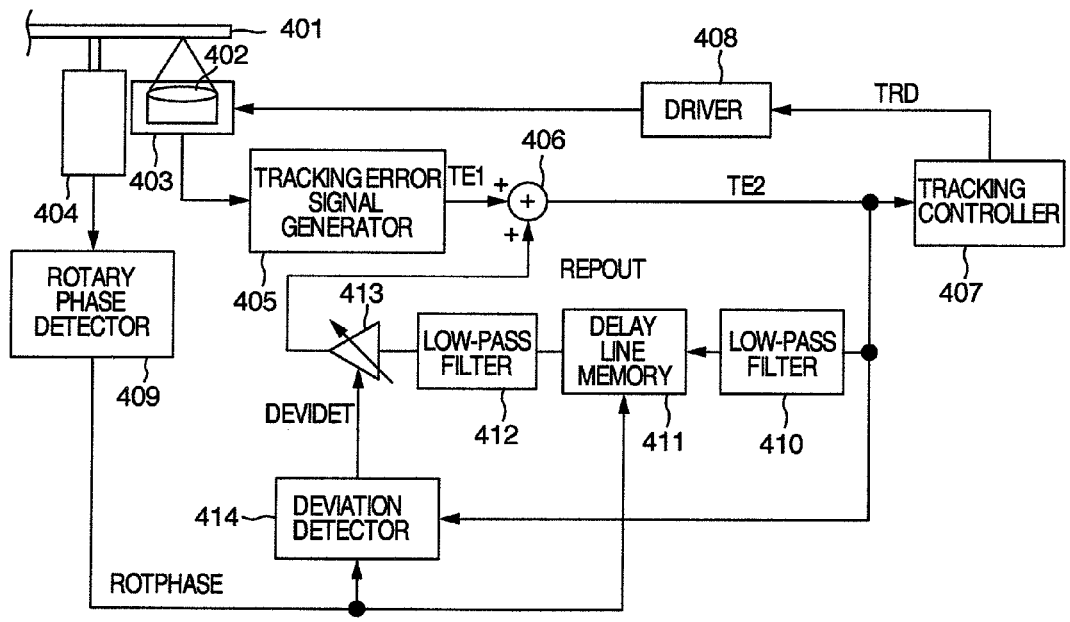
FIG. 4 is a block diagram showing an optical disk device in a first embodiment.

FIG. 4 shows a configuration of the optical disk of the embodiment in a block diagram.

Reference numeral 401 is an optical disk. Onto the optical disk 401, a laser beam is radiated to achieve reading, erasing, and writing operations for information on the disk 401. The optical disk 401 may be any kind of optical disks including a Compact Disk (CD), a Digital Versatile Disk (DVD), and a Blu-ray Disk (BD). The embodiment is particularly efficient for an optical disk including at least three layers. This is because the influence of the deviation is considerably large for such disks.

Reference numeral 402 indicates an objective lens. The objective lens 402 collects a laser beam to focus the beam onto a recording surface of the optical disk 401.

Reference numeral 403 is an optical pickup including a tracking actuator, not shown. The pickup 403 also includes an optical sensor or detector, not shown, which detects reflection light reflected from the optical disk 401 to produce an electric signal according to quantity of the reflection light.

Reference numeral 404 is a spindle motor. The spindle motor 404 drives the optical disk 401 to rotate at a predetermined linear speed. The rotary period of the spindle motor 402 is represented by $T_{rot}$.

Reference numeral 405 is a tracking error generator. The generator 405 receives an output signal from the optical sensor of the optical pickup 403 to accordingly produce, as a tracking error signal TE1, a voltage proportional to the following error.

Reference numeral 406 is an adder. The adder 406 adds the tracking error signal TE1 to a compensation signal (REPOUT) from a variable gain element 413, which will be described later, to resultantly produce a signal TE2.

Reference numeral 407 indicates a tracking controller, which compensates the gain and the phase for the signal TE2 to generate a drive signal (TRD).

Reference numeral 408 is a driver. The driver 408 amplifies the signal TRD from the tracking controller 407 and delivers the amplified signal to the tacking actuator of the optical pickup 403.

Reference numeral 409 is a rotary phase detector. The detector 409 receives an output signal from the spindle motor 404 to produce rotary phase information (ROTPHASE). The information ROTPHASE is a value ranging from 0 to N-1 (N is an integer equal to or more than one). Specifically, one rotation of the spindle motor 404 is equally divided by N to obtain phase information.

That is, when the rotary angle of the rotary axle of the spindle motor is represented by θ° (0≦θ<360), a value PH of the information ROTPHASE is derived from $$PH = \text{int}\left(N \times \frac{\theta}{360}\right) \tag{10}$$

Wherein, function int(a) is a function which returns, for an argument a, a maximum integer equal to or more than a. The value PH of the information ROTPHASE is updated at an interval of $T_{rot}/N$.

Reference numeral 410 is a first low-pass filter, which attenuates a high-frequency component contained in the signal TE2.

Reference numeral 411 indicates a delay line memory. The memory 411 receives an output signal from the low-pass filter 410 according to the information ROTPHASE and stores the value of the signal by dividing the one rotation by N. Based on the value thus stored, the delay line memory 411 produces and outputs, at timing synchronized with the rotation, a signal to compensate the periodic disturbance inputted to the servo system.

Reference numeral 412 is a second low-pass filter, which attenuates a high-frequency component contained in the output signal from the delay line memory 411.

Reference numeral 413 indicates a variable gain element, which multiplies the output signal from the low-pass filter 412 by a predetermined coefficient K to produce a compensation signal (REPOUT). The coefficient value K set to the variable gain element 413 is changed according to a deviation detection signal (DEVIDET) from a deviation detector 414, which will be described later. Assume that the value of K ranges from zero to one.

Reference numeral 414 is a deviation detector. The deviation detector 414 receives the signal TE2 and the information ROTPHASE to detect a deviation to resultantly produce a deviation detection signal (DEVIDET).

In the optical disk device of the present embodiment, the section which receives the tracking signal TE1 to produce the signal TE2 is defined as an iterative learning control system. That is, the iterative learning control system includes the low-pass filter 410, the delay line memory 411, the low-pass filter 412, the variable gain element 413, and the adder 406.

In the optical disk device of the present embodiment, the iterative learning control system serves as the characteristic change section. Specifically, by changing the value of the variable gain element 413, the characteristic (the transfer function characteristic from the tracking error signal TE1 to the tracking error signal TE2) of the iterative learning control system is changed.

Figure 5:
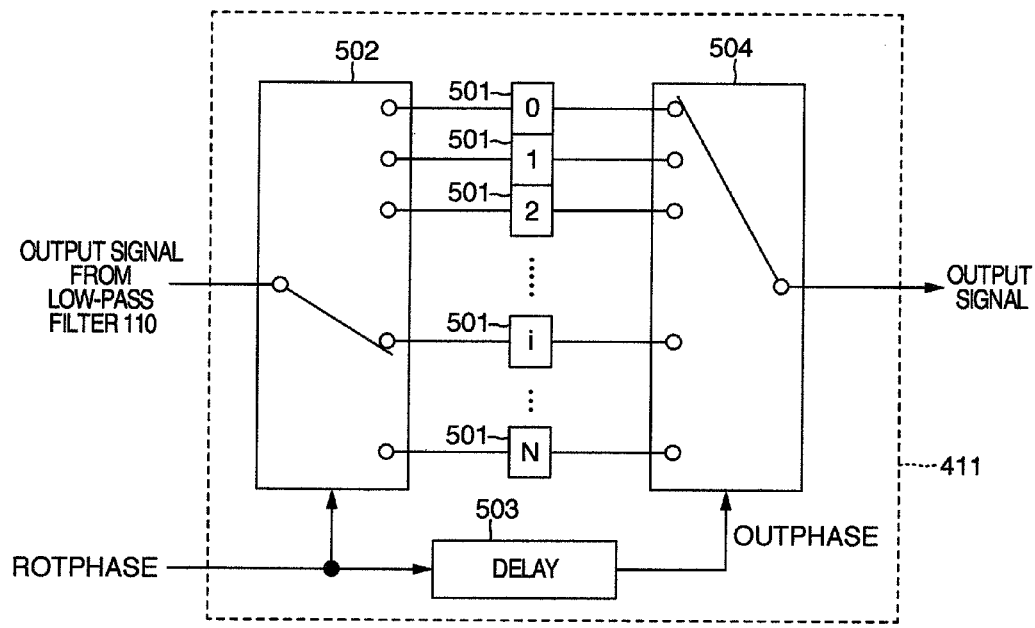
FIG. 5 is a block diagram showing structure of a delay line memory in the first embodiment.

Referring now to FIG. 5, description will be given of a specific configuration of the delay line memory 411 according to the embodiment.

Reference numeral 501 is a storage or memory circuit. To store the value of a signal by dividing the one rotation by N, the system includes, for example, N memory circuits 501. When the tracking servo system of the embodiment is implemented by using a digital servo system, the memory circuit 501 may be configured by use of, for example, a flash memory.

Reference numeral 502 is a first selector, which receives an output signal from the low-pass filter 410 to conduct a changeover operation between N storage circuits 501. At timing when the value of the information ROTPHASE changes, the first selector 502 selects one of the storage circuits 501 corresponding to the value of the information ROTPHASE. The memory circuit 501 selected by the selector 502 stores therein the value of an input signal at timing of the selection by the selector 502.

Reference numeral 503 is a delay circuit. The delay circuit 503 delays the signal representing the value of the information ROTPHASE for a predetermined period of time to obtain delayed phase information and outputs the information as output phase information (OUTPHASE). The delay time of the delay circuit 5 is represented as $T_{dly}$.

Reference numeral 504 is a second selector. At timing when the value of the information OUTPHASE changes, the second selector 504 selects one of the storage circuits 501 corresponding to the value of the information OUTPHASE and outputs, as an output signal from the delay line memory 411, the value stored in the memory circuit 501 thus selected.

Figure 6:
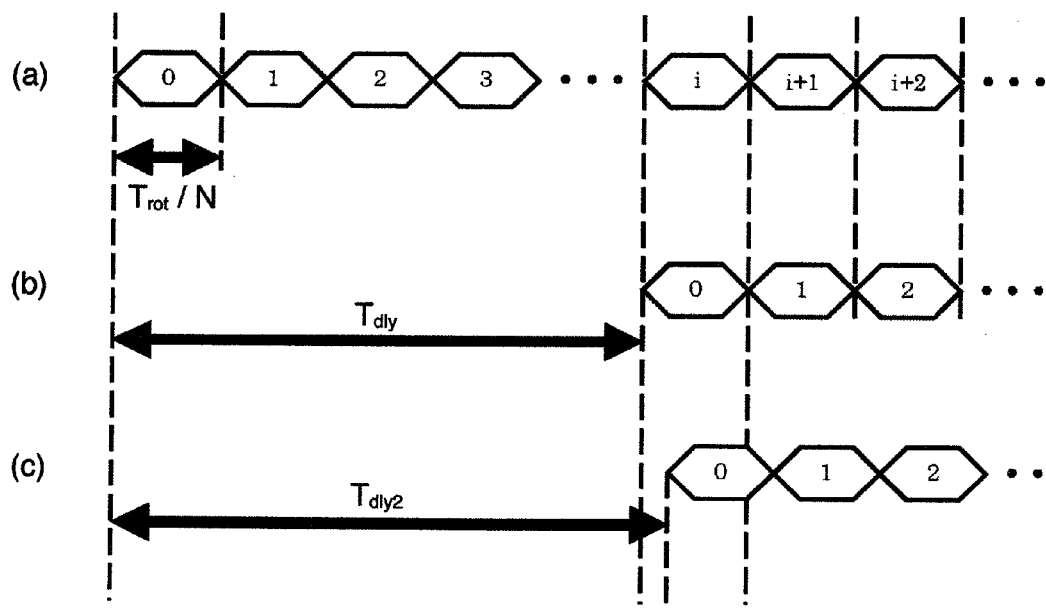
FIG. 6 is a signal timing chart for explaining operation of the delay line memory in the first embodiment.

Referring now to the timing chart of FIG. 6, description will be given of operation of the delay circuit 503. FIG. 6 shows the information ROTPHASE in (a), the information OUTPHASE in (b), and a variation of the information OUTPHASE in (c).

In FIG. 6, (b) represents a situation in which the information OUTPHASE is obtained by adding a predetermined value (i in FIG. 6) to the information ROTPHASE. In this situation, when the tracking servo system of the embodiment is implemented by using a digital servo system, the information OUTPHASE is obtained by adding a predetermined value to the information ROTPHASE saved in a flash memory or the like. The result of the addition is stored in the delay line memory 411. Hence, the memory 411 can be implemented in a simple configuration. The delay time of the delay circuit 503 is adjustable at precision of $T_{rot}/N$, which is an update period of the information ROTPHASE.

Description will next be given of the variation shown in (c) of FIG. 6. In (b) of FIG. 6, the delay time of the delay circuit 503 is adjusted at the precision $T_{rot}/N$. However, such precision is not required in (c) of FIG. 6. Assume in the variation shown in (c) that the delay time $T_{dly2}$ of the delay circuit 503 is adjusted at a precision less than $T_{rot}/N$ with respect to time.

Referring now to the waveforms shown in FIG. 7, description will be given of a method of determining the delay time $T_{dly}$ of the delay circuit 503.

Figure 7:
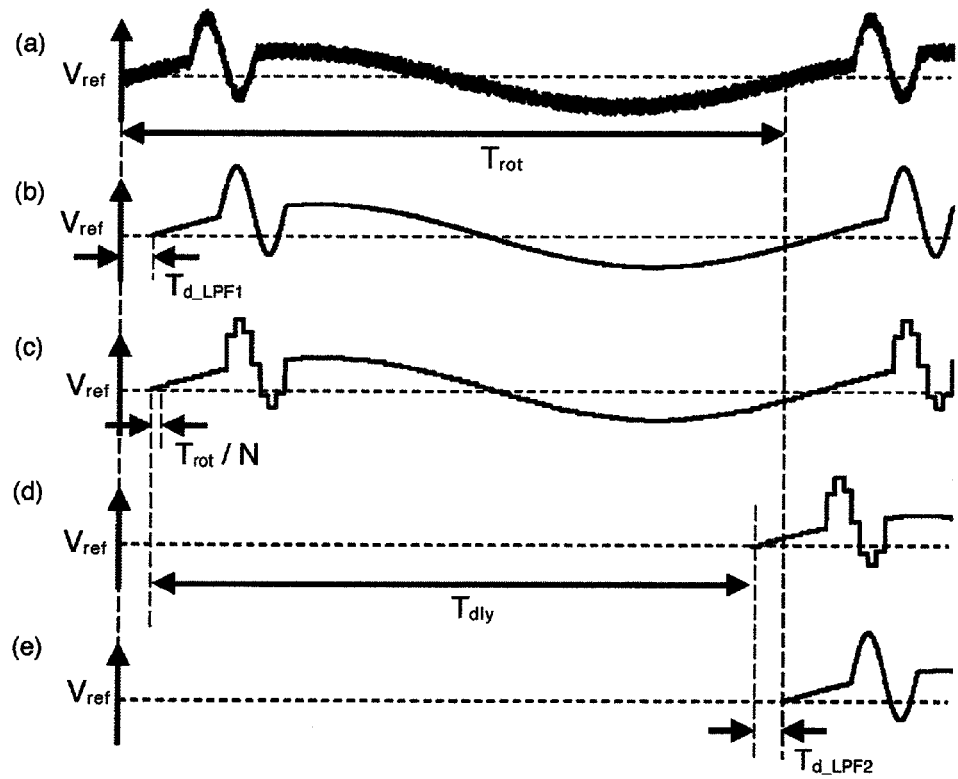
FIG. 7 is a graph of signal waveforms in constituent sections of an iterative learning control system for explaining a method of determining a period of delay time in the first embodiment.

FIG. 7 shows signal waveforms at respective sections of the iterative learning control system. $V_{ref}$ indicates a reference level. In FIG. 7, (a) is a signal waveform of TE2 and (b) is a waveform of an output signal from the low-pass filter 410. Also, (c) is a waveform equivalently showing a signal stored in the memory circuit 501, (d) is a waveform equivalently showing an output signal from the delay line memory 411, and (e) is a waveform of the signal REPOUT.

In the waveform of (b), the high-frequency component is attenuated as compared with the waveform of (a) and the signal which passes the low-pass filter 410 is delayed for delay time $T_{d\_LPF1}$. In the waveform of (c), the value of the input signal is held to be stored at an interval of time of $T_{rot}/N$ based on the information ROTPHASE. The signal is delayed for $T_{d\_HOLD}$, not shown, as compared with the waveform of (b). In the waveform of (d), when the delay time $T_{dly}$ of the delay circuit 503 lapses, the stored value is outputted. In the waveform of (e), the high-frequency component contained in the step-shaped waveform is attenuated and the signal which passes the low-pass filter 412 is delayed for delay time $T_{d\_LPF2}$.

The delay time $T_{dly}$ is determined by use of one rotary period $T_{rot}$ of the optical disk as follows.

$$T_{dly} = T_{rot} - T_{d\_LPF1} - T_{d\_HOLD} - T_{d\_LPF2} \quad (11)$$

The delay circuit 503 delays the signal for $T_{dly}$ determined by expression (11) to thereby correct the signal delay of the signal propagating through the iterative learning control loop. Hence, the difference in time between the waveform (a) and the waveform (e) is appropriately one rotary period $T_{rot}$. That is, the signal REPOUT created for the signal TE2 inputted to the low-pass filter 410 is added to the signal of the servo loop by the adder 406 correctly at timing when the one rotary period lapses.

In the operation, when $T_{dly}$ differs from the value derived from expression (11), the adder 406 cannot conduct the addition at appropriate timing, which lowers the suppression degree of the iterative learning control. It is hence desirable that $T_{dly}$ is adjusted at precision shorter than $T_{rot}/N$ with respect to time to possibly minimize the difference between $T_{dly}$ and the value from expression (11).

Next, description will be given of the tracking servo operation when the iterative learning control is not employed in the present embodiment.

Figure 8:
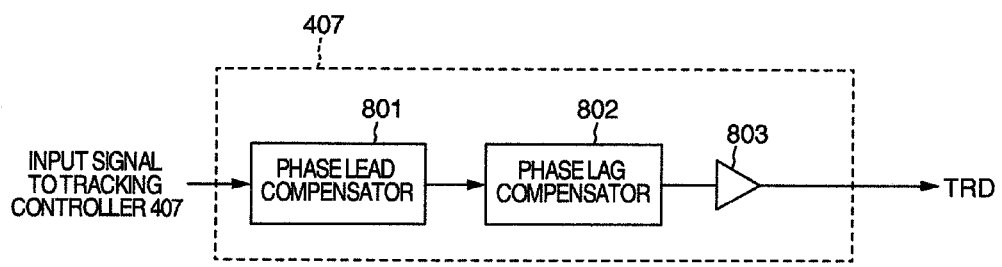
FIG. 8 is a block diagram showing structure of a tracking control circuit of the delay line memory in the first embodiment.

Referring now to FIG. 8, description will be given of a configuration of the tracking controller 407 in the present embodiment. The tracking controller 407 includes a serial connection of a phase lead compensator 801, a phase lag compensator 802, and a fixed gain element 803.

Figure 9:
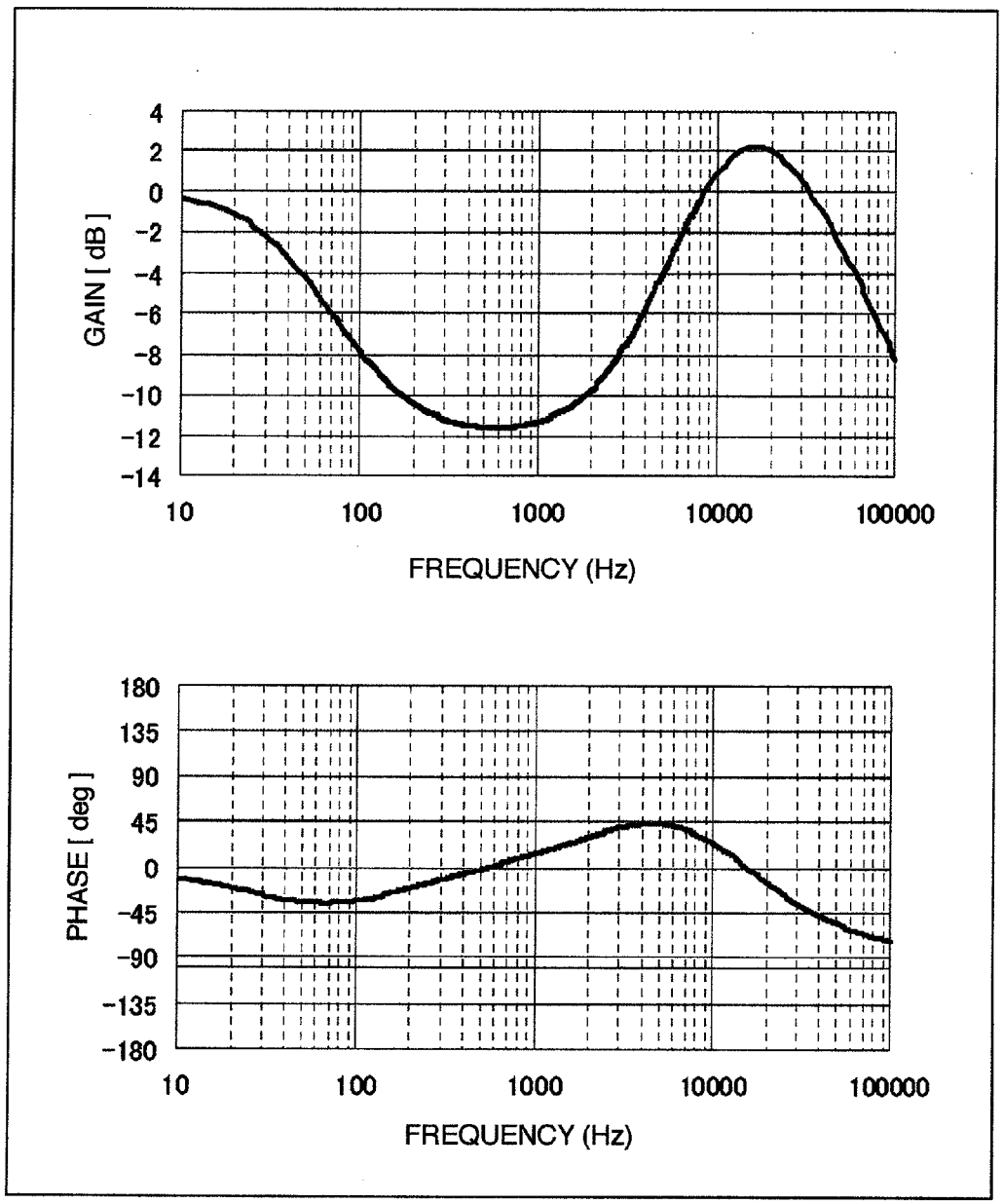
FIG. 9 is a Bode diagram of the tracking controller in the first embodiment.

FIG. 9 shows an example of a Bode diagram of the tracking controller 407.

Figure 10:
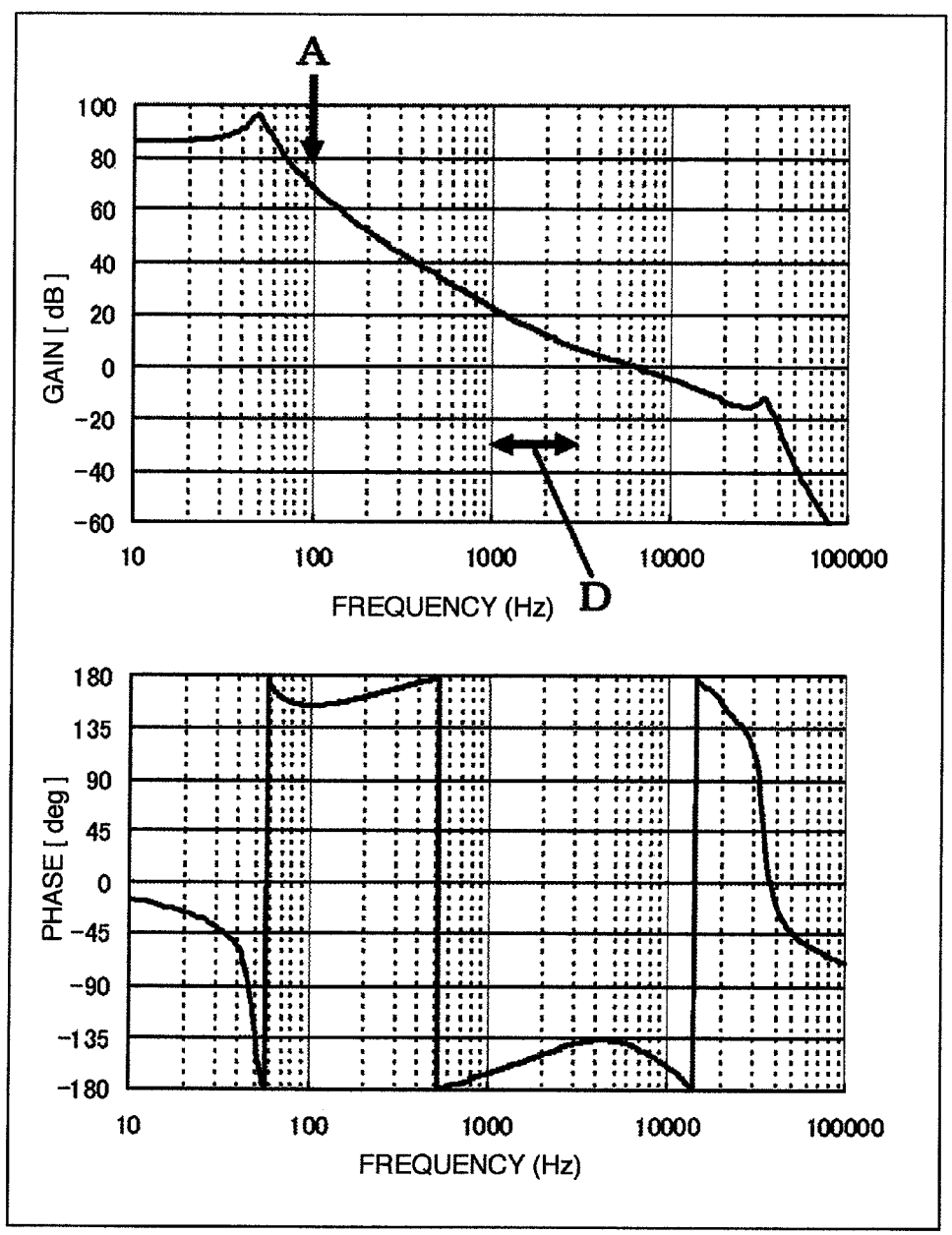
FIG. 10 is a Bode diagram of the open-loop transfer function in the first embodiment.

FIG. 10 shows a Bode diagram of an open-loop transfer function. In FIG. 10, A represents a rotary period. In the embodiment, the rotary period is 100 Hertz (Hz) as an example. D indicates a frequency range in which a deviation is present. Assume in the embodiment that the frequency range D includes frequencies ranging from one kilohertz (kHz) to 3 kHz as an example. Description will be given of an iterative learning control system having suppression effect in the frequency range. Even when the frequency range D is other than the range from 1 kHz to 3 kHz, the embodiment is naturally applicable.

In the embodiment, it is assumed that the number N of storage circuits 501 in the delay line memory 411 is determined to store the contour of deviation components of the frequencies contained in the frequency range D shown in FIG. 10.

Figure 11:
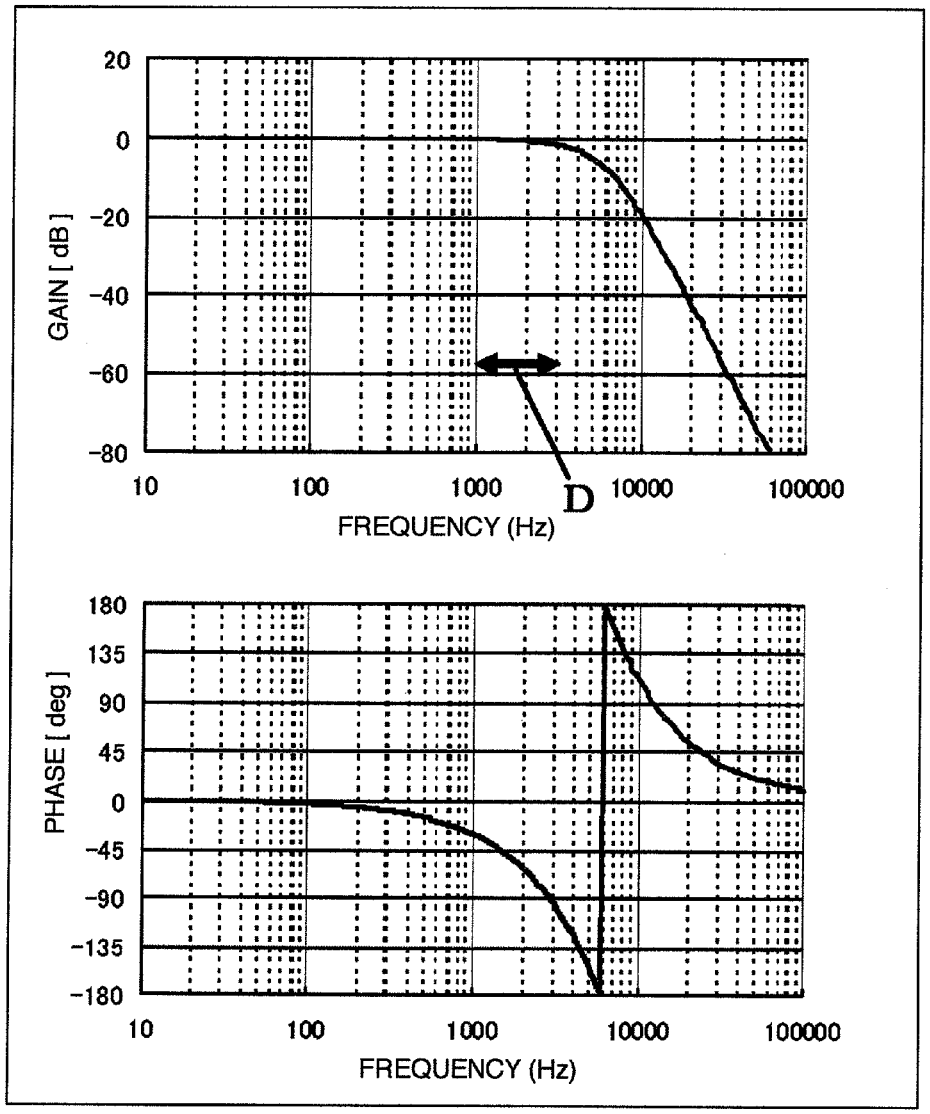
FIG. 11 is a Bode diagram of a low-pass filter in the first embodiment.

FIG. 11 shows an example of the Bode diagram of the low-pass filter 410. For the filter 410, it is assumed that the low-frequency band gain is 0 dB and the cutoff frequency is higher than the upper-most frequency of the frequency range D. Hence, the signal component with a frequency in the frequency range D passes through the low-pass filter 410 without being attenuated. For the disturbance component in the frequency range D, a compensation signal (REPOUT) is produced through the iterative learning control. In the operation, the signal component with a frequency beyond the cutoff frequency of the filter 410 is attenuated. Hence, for the disturbance component of the higher frequency, the signal REPOUT is not produced.

The low-pass filter 410 has a linear phase characteristic in its pass band. This is because the delay time of the signal which passes through the filter 410 is fixed in the frequency range D to resultantly improve performance of the iterative learning control.

Figure 12:
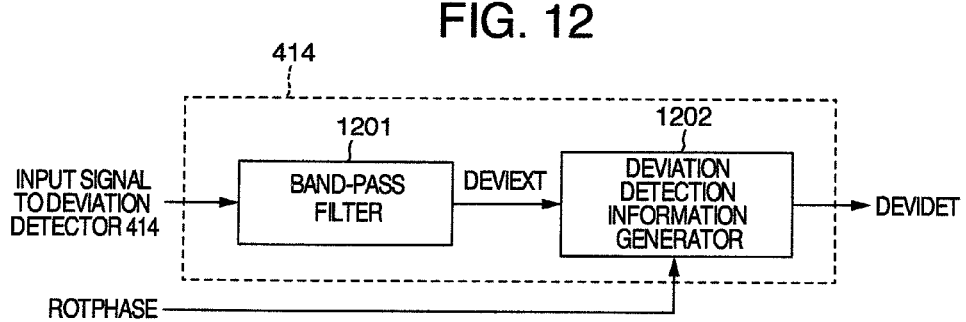
FIG. 12 is a block diagram showing a configuration of a deviation detector in the first embodiment.

Description has been given of an example of the Bode diagram of the low-pass filter 410. This also applies to the Bode diagram of the low-pass filter 412. Referring next to FIG. 12, description will be given of a configuration of the deviation detector 414 in the present embodiment.

Reference numeral 1201 is a band-pass filter, which produces a signal DEVIEXT. The signal DEVIEXT is a signal produced from the signal TE2 as an input signal to the deviation detector 414 by attenuating a rotary period component, its second-order component, its third-order component, and a high-frequency noise component.

Reference numeral 1202 is a deviation detection information generator. The generator 1202 receives as inputs thereto the signals DEVIEXT and ROTPHASE, detects during one rotation of the spindle motor 404 whether or not a deviation is detected, and produces a deviation detection signal DEVIDET.

Figure 13:
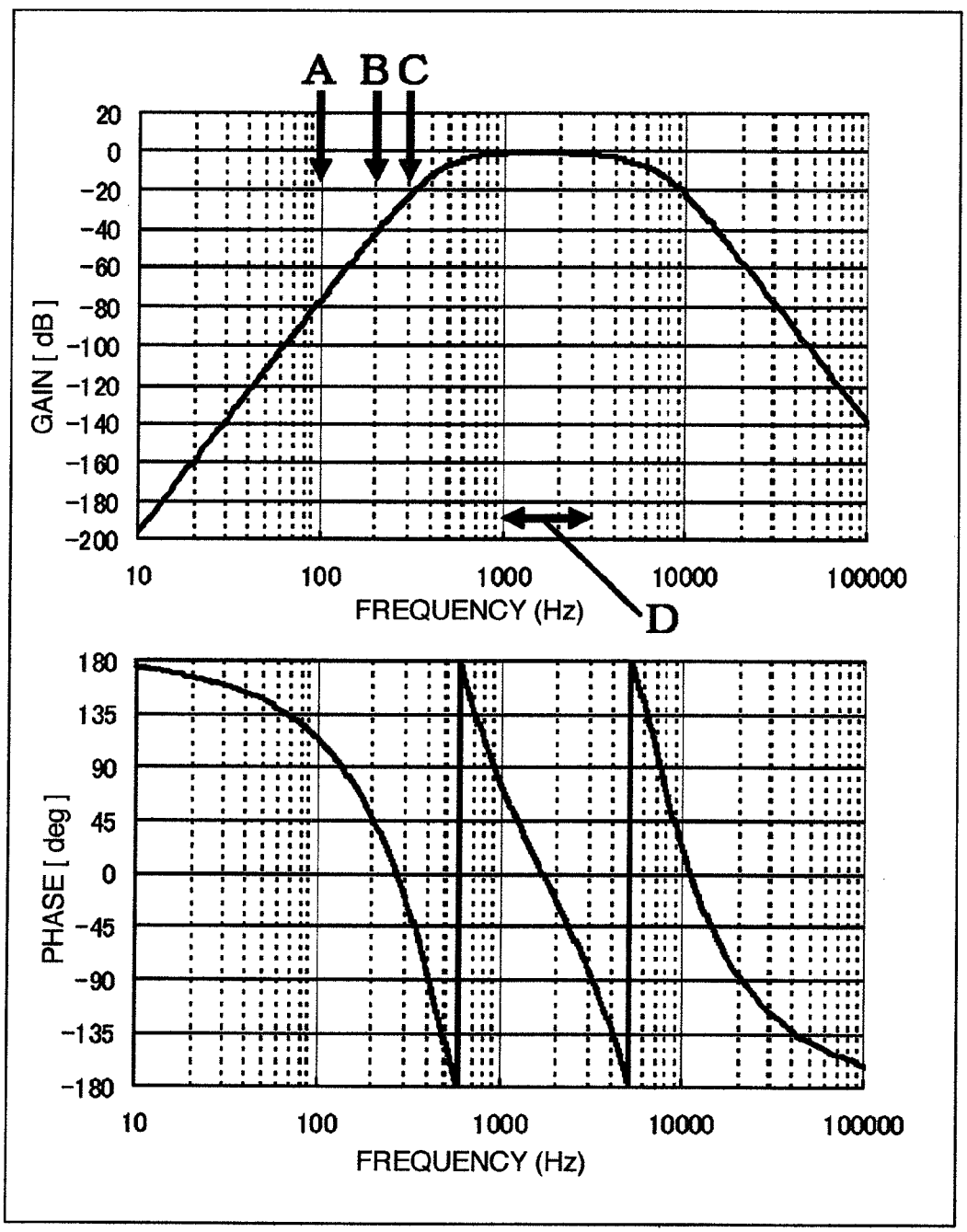
FIG. 13 is a Bode diagram of a band-pass filter in the first embodiment.

Next, referring to FIG. 13, description will be given of an example of the frequency characteristic of the band-pass filter 1201. In FIG. 13, A indicates the rotary period, B is a frequency obtained by multiplying the rotary period by two, and C is a frequency obtained by multiplying the rotary period by three. Also, D indicates a range of frequencies in which a deviation is present.

The band-pass filter 1201 has a gain characteristic in which the frequency range D is in the pass band and the frequencies A to C are in its attenuation band. Hence, the filter 1201 attenuates the rotary period component and its second-order and third-order components due to the eccentricity of the optical disk 401.

Figure 14:
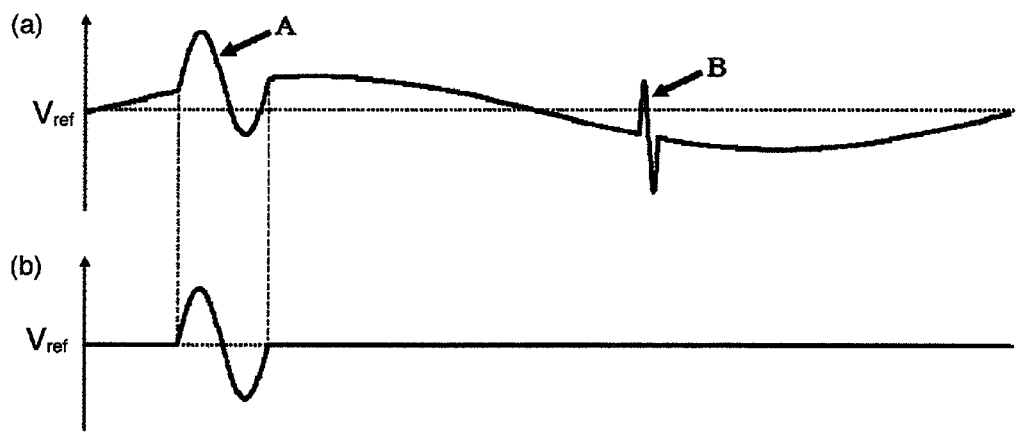
FIG. 14 is a waveform graph for explaining effect of the band-pass filter in the first embodiment.

Referring to waveforms shown in FIG. 14, description will be given of an advantage of the band-pass filter 1201. In FIG. 14, (a) is an input signal to the deviation detector 414 and (b) is the signal DEVIEXT. In (a), reference numeral A indicates a deviation component and reference numeral B indicates a high-frequency noise component.

In the signal DEVIEXT of (b) having passed the band-pass filter 1201, the rotary period component due to the eccentricity and the high-frequency noise component are attenuated. Hence, the signal DEVIEXT includes only the deviation component.

Figure 15:
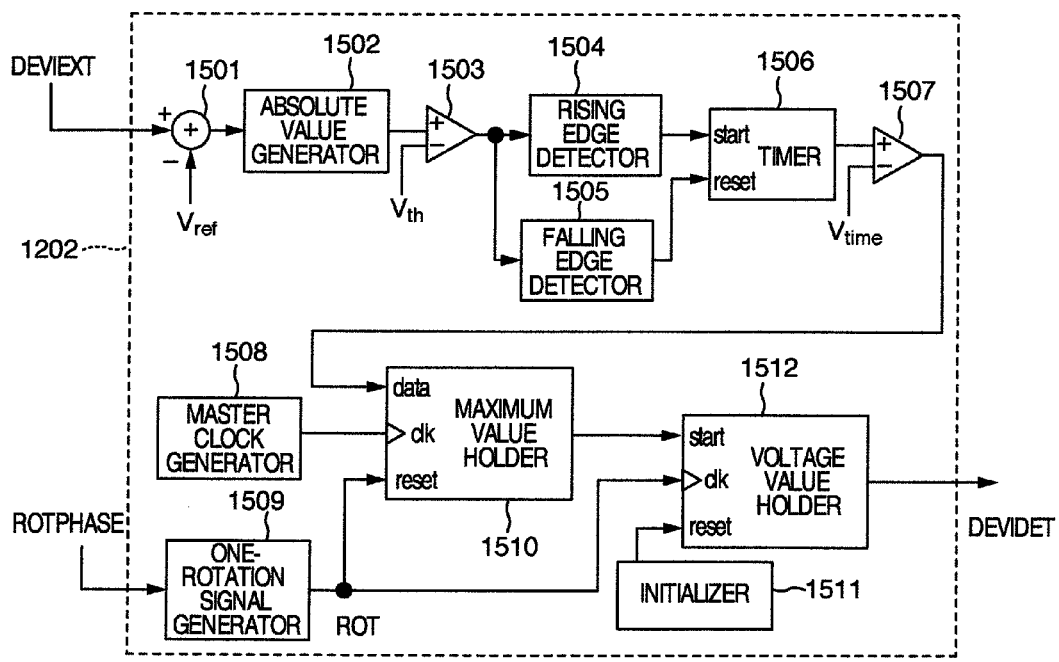
FIG. 15 is a block diagram for explaining a configuration of a deviation detection information generator in the first embodiment.

Referring now to the block diagram of FIG. 15, description will be given of a configuration of the deviation detection information generator 1202.

Reference numeral 1501 is a subtractor. The subtractor 1501 produces the difference between the signal DEVIEXT inputted to the deviation detection information generator 1202 and the reference level $V_{ref}$.

Reference numeral 1502 indicates an absolute value generator, which receives the output signal from the subtractor 1501 to produce an absolute value thereof.

Reference numeral 1503 is a first comparator, which compares the output signal from the absolute value generator 1502 with a predetermined threshold value $V_{th}$ to resultantly produce an output signal.

Reference numeral 1504 indicates a rising edge detector, which detects a rising edge of the output signal from the comparator 1503.

Reference numeral 1505 is a falling edge detector, which detects a falling edge of the output signal from the comparator 1503.

At detection of the associated edge, each of the rising and falling edge detectors 1504 and 1505 outputs a high-level signal for a predetermined period of time and then returns to a state to output a low-level signal.

Reference numeral 1506 is a 2-input and 1-output timer. The two input signals include a signal to start operation of the timer and a signal to reset the timer. When the output signal from the rising edge detector 1504 goes up to a high level, the timer 1506 starts the time measuring operation. When the output signal from the falling edge detector 1505 goes up to a high level, the timer 1506 is reset. The timer 1506 also produces an output signal, which is a voltage level proportional to the value of the timer 1506.

Reference numeral 1507 indicates a second comparator, which compares the output signal from the timer 1506 with a predetermined threshold value $V_{time}$ to resultantly produce an output signal indicating the result of comparison.

Reference numeral 1508 is a master clock generator, which generates a clock signal having a predetermined frequency.

Reference numeral 1509 is a one-rotation signal generator. The generator 1509 receives the information ROTPHASE to detect an event in which the value PH of the information ROTPHASE is zero, and then produces a one-rotation signal (ROT). The signal ROT goes up to a high level at timing when the value PH of the information ROTPHASE becomes zero. Thereafter, the signal ROT is kept at the high level for a predetermined period of time and then is returned to a low level.

Reference numeral 1510 is a maximum value holder, which is a 3-input and 1-output circuit. The input signals to the holder 1510 include a clock input (a clk terminal in FIG. 15) to input a clock signal for the operation of the holder 1510, a data input (a data terminal in FIG. 15) to input a signal to hold a maximum value, and a reset input (a reset terminal in FIG. 15) to indicate the holder 1510 to discard the maximum value held therein.

The maximum value holder 1510 monitors the data input at an interval of the clock signal inputted to the clock input terminal to hold the maximum value of the data. In the present embodiment, the data input is a signal which takes only two levels, i.e., a high level and a low level. Hence, at timing when the data input goes up to a high level, the maximum value holder 1510 outputs a high-level signal. Thereafter, the holder 1510 continuously keeps the signal at a high level unless a high-level signal is inputted to the reset input terminal. When a high-level signal is inputted to the reset input terminal, the maximum value holder 1510 outputs a low-level signal.

In the maximum value holder 1510, the clock input is a master clock signal generated from the master clock generator 1508 and the data input is the output signal from the comparator 1507. Hence, the maximum value holder 1510 monitors the output signal from the comparator 1507 at an interval of the master clock. When the output signal is set to a high level, the holder 1510 keeps a state in which the high-level signal is being outputted. The reset signal is the signal ROT, and the voltage value thus held by the holder 1510 is discarded for each rotation of the spindle motor 404.

Reference numeral 1511 indicates an initializer. The initialize 1511 produces a signal, which is at a high level for a predetermined period of time at initialization of the optical disk device and which is kept at a low level thereafter.

Reference numeral 1512 is a voltage value holder, which is a 3-input and 1-output circuit. The input signals to the voltage holder 1512 include a clock input (a clk terminal in FIG. 15) to input a clock signal for the operation of the holder 1512, a data input (a data terminal in FIG. 15) to input a voltage value to be held by the holder 1512, and a reset input (a reset terminal in FIG. 15) to indicate the holder 1512 to discard the voltage value held therein. The voltage value holder 1512 holds a voltage value of the data input at a period of the clock inputted to the clock input terminal. After this point, the holder 1512 keeps holding the voltage value unless a high-level signal is inputted to the reset input terminal. The holder 1512 outputs a low-level signal when a high-level signal is inputted to the reset input terminal.

The clock input signal to the voltage value holder 1512 is the signal ROT and the data input signal thereto is the output signal from the maximum value holder 1510. Hence, for each rotary period of the spindle motor 404, the voltage value holder 1512 holds the voltage value of the output signal from the maximum value holder 1510. The reset input signal to the voltage value holder 1512 is the output signal from the initializer 1511. Once reset at initialization of the optical disk device, the value of the voltage value holder 1512 is not reset during the operation.

Referring now to waveforms shown in FIGS. 16A and 16B, description will be given of operation of the deviation detection information generator 1202.

Figure 16A:
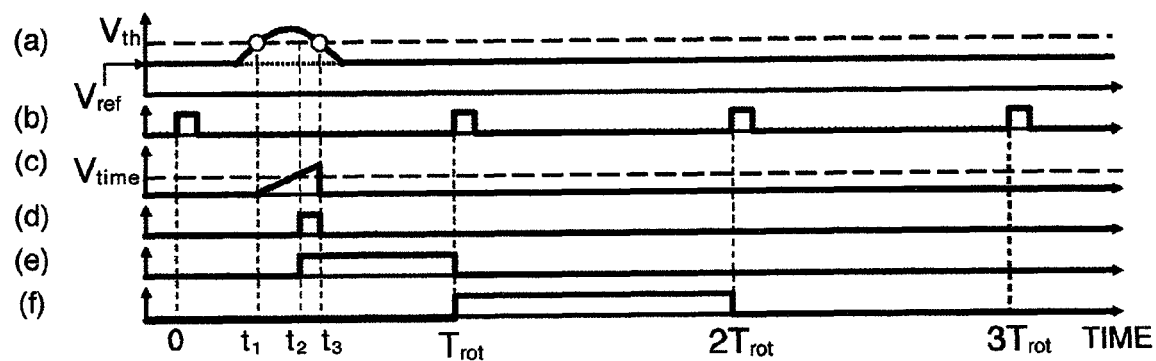
FIG. 16A is a waveform graph for explaining operation of the deviation detection information generator in the first embodiment.

FIG. 16A shows signal waveforms of constituent elements of the deviation detection information generator 1202 when a deviation is present only in one rotation of the spindle motor 404. In FIG. 16A, (a) is the output signal from the absolute value generator 1502, (b) is the signal ROT, (c) is the output signal from the timer 1506, (d) is the output signal from the comparator 1507, (e) is the output signal from the maximum value holder 1510, and (f) is the output signal DEVIDET from the voltage value holder 1512. In FIGS. 16A and 16B, the point of time t when the signal ROT is first set to a high level is represented as t=0.

When the output signal from the absolute value generator 1502 exceeds a predetermined threshold value $V_{th}$ at $t=t_1$, the rising edge detector 1504 detects the event in which the output signal is more than $V_{th}$ and then the timer 1506 resultantly starts its operation.

When the output signal from the timer 1506 exceeds a predetermined threshold value $V_{time}$ at $t=t_2$, the comparator 1507 sets its output signal to a high level and the maximum value holder 1510 holds the high-level state.

When the period of time in which the output signal from the absolute value generator 1502 is more than the predetermined threshold value $V_{th}$ is less than $V_{time}$, the output signal from the comparator 1507 is not set to a high level.

When the output signal from the absolute value generator 1502 becomes less than the threshold value $V_{th}$ at time $t=t_3$, the falling edge detector 1505 detects the event in which the output signal is less than $V_{th}$, and the operation of the timer 1506 is reset. As a result, the output signal from the comparator 1507 goes down to a low level.

When the signal ROT goes up to a high level at $t=T_{rot}$, the voltage value holder 1512 starts its operations to produce a high-level signal. Simultaneously, the reset input signal to the maximum value holder 1510 is set to a high level and then the holder 1510 produces a low-level signal.

FIG. 16A shows a situation in which no deviation is detected during a period represented as $T_{rot} \leq t \leq 2T_{rot}$. In this situation, the signal ROT goes up again to a high level at $t=2T_{rot}$ and the start signal to the voltage value holder 1512 goes up to a high level. Since the output signal from the maximum value holder 1510 is at a low level, the output signal from the voltage value holder 1512 goes down to a low level.

Figure 16B:
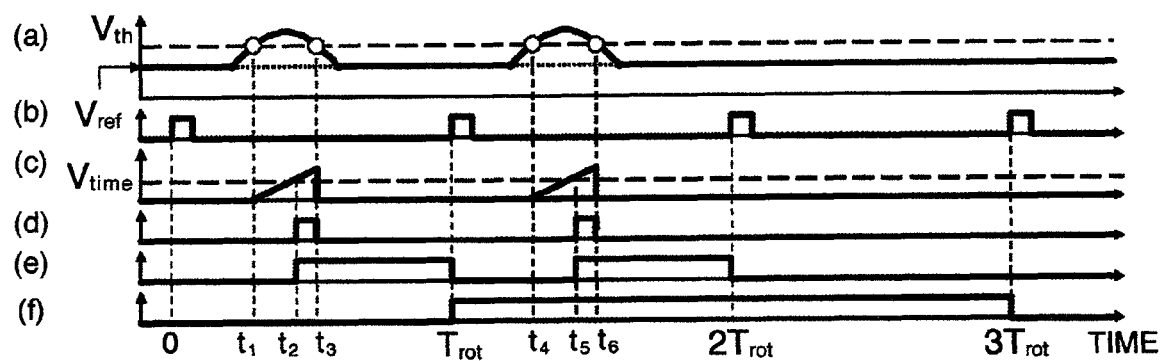
FIG. 16B is a waveform graph for explaining operation of the deviation detection information generator in the first embodiment.

FIG. 16B shows a situation in which no deviation is detected also during a period represented as $T_{rot} \leq t \leq 2T_{rot}$. When the signal ROT goes up to a high level at $t=2T_{rot}$, a second voltage value holder 1512 starts its operation. In this situation, since the output signal from the maximum value holder 1510 is at a high level, the output signal from the voltage value holder 1512 is kept at a high level.

Additionally, FIG. 16B shows a situation in which no deviation is detected during a period represented as $2T_{rot} \leq t \leq 3T_{rot}$. At time $t=3T_{rot}$, through an operation similar to that conducted at $t=2T_{rot}$ shown in FIG. 16A, the output signal from the voltage value holder 1512 goes down to a low level.

As above, the deviation detection information generator 1202 detects a deviation by detecting an event wherein the period of time in which the absolute value of the signal DEVIEXT is more than the threshold value $V_{th}$ exceeds a predetermined period of time ($t_2-t_1$). The signal DEVIDET from the deviation detection information generator 1202 is kept at a high level if presence of a deviation is detected at timing delayed by one rotary period of time, namely, if a deviation exists in a succeeding rotation of the spindle motor 404.

Next, description will be given of operation of the variable gain element 413. The gain value K of the element 413 ranges from 0 to one. The gain value K varies depending on the level of the signal DEVIDET. Assume that the gain value K is greater when the signal DEVIDET is at a high level than when the signal DEVIDET is at a low level.

Description will now be given of an advantage of the present embodiment. In the description, the state in which the signal DEVIDET is at a low level is referred to as a steady state. The state in which the signal DEVIDET is at a high level is referred to as a characteristic changeover state. In this example, the gain value K takes 0.5 in the steady state and 1 in the characteristic changeover state.

Figure 17A:
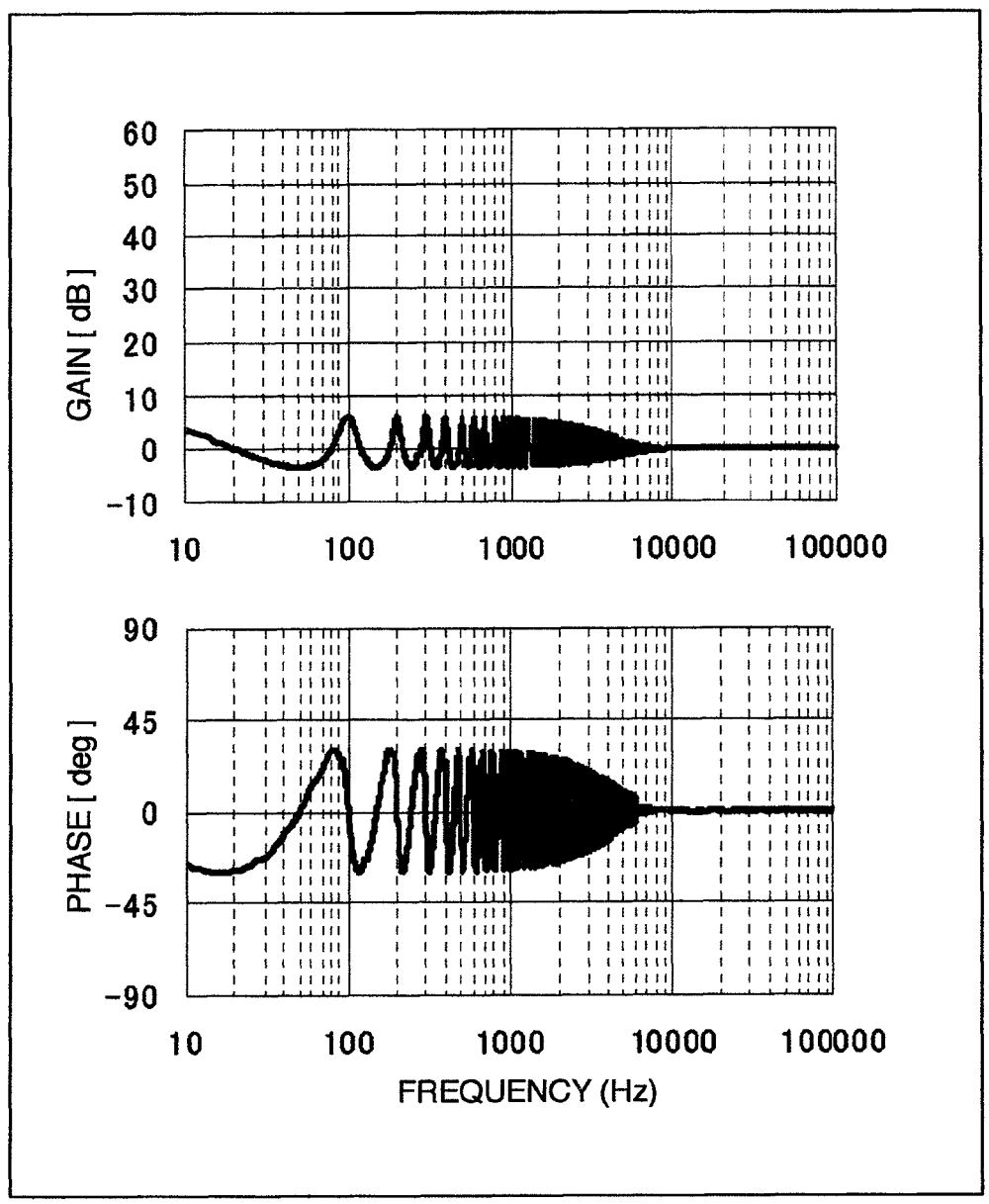
FIG. 17A is a Bode diagram of an iterative learning control in the first embodiment.
Figure 17B:
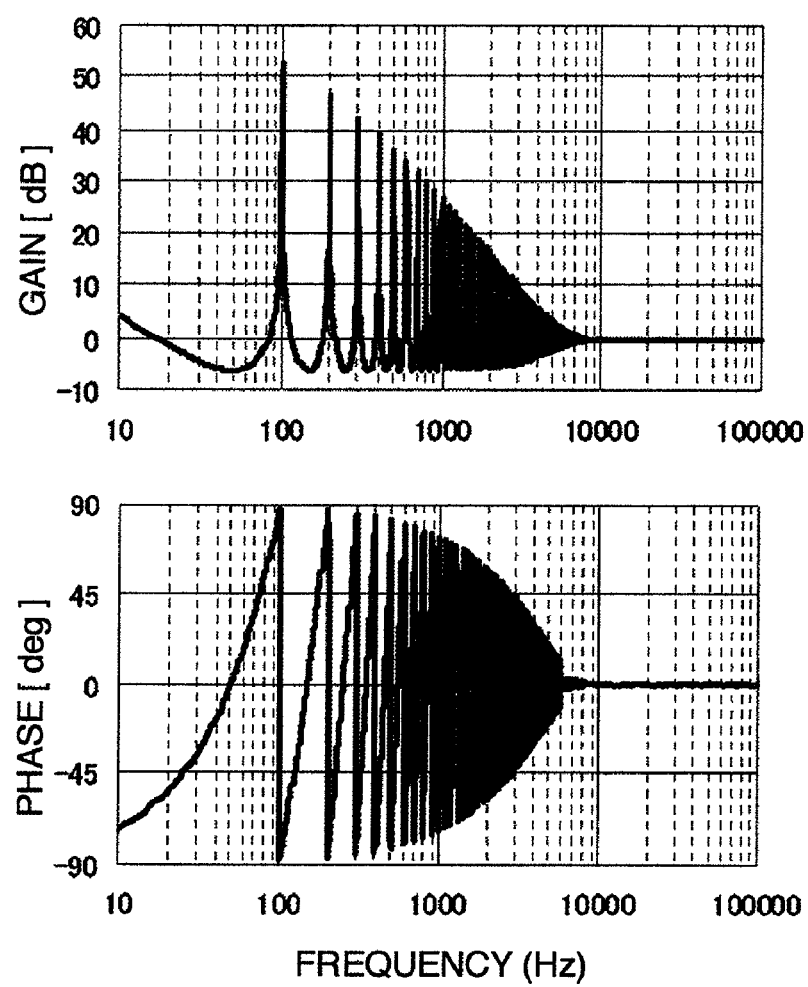
FIG. 17B is a Bode diagram of an iterative learning control in the first embodiment.

FIGS. 17A and 17B show Bode diagrams of an iterative learning control in the steady state and the characteristic changeover state, respectively.

The gain graph of the iterative learning control has a comb-shaped characteristic in which a peak appears for an integral multiple of the rotary period. For a frequency obtained by multiplying the rotary period by an odd-number multiple of 0.5 (namely, 0.5 multiplied by an odd number, for example, 1.5 or 2.5), the gain takes a negative value.

It can be recognized that the variation in the phase characteristic becomes greater as the gain of the iterative learning control becomes greater. In a state in which the iterative learning control system has an ideal characteristic, for example, the low-pass filter of the iterative learning control system has a linear phase characteristic, the phase of the single iterative learning control is 0 degree (deg) for a higher-order frequency of the rotary period. Hence, a frequency of which the phase characteristic varies centered on 0 deg is a frequency other than the higher-order frequency of the rotary period.

In consideration of stability of the overall feedback control system, when the gain value K of the variable gain element 413 is set to a large value in the iterative learning control system, the phase margin is reduced for the frequency other than the higher-order frequency of the rotary period. This leads to a fear that the stability of the feedback control system is deteriorated. Hence, in the steady state, the gain value K of the variable gain element 413 of the iterative learning control system is desirably determined in consideration of the stability of the feedback control system.

Figure 18A:
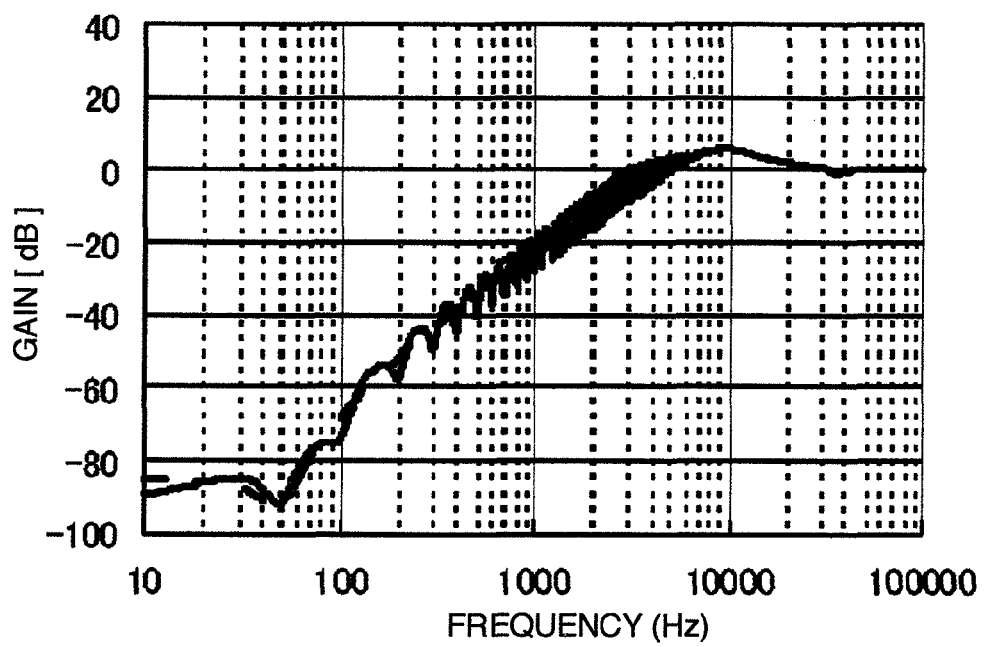
FIG. 18A is a graph of a servo gain of a sensitivity function in the first embodiment.
Figure 18B:
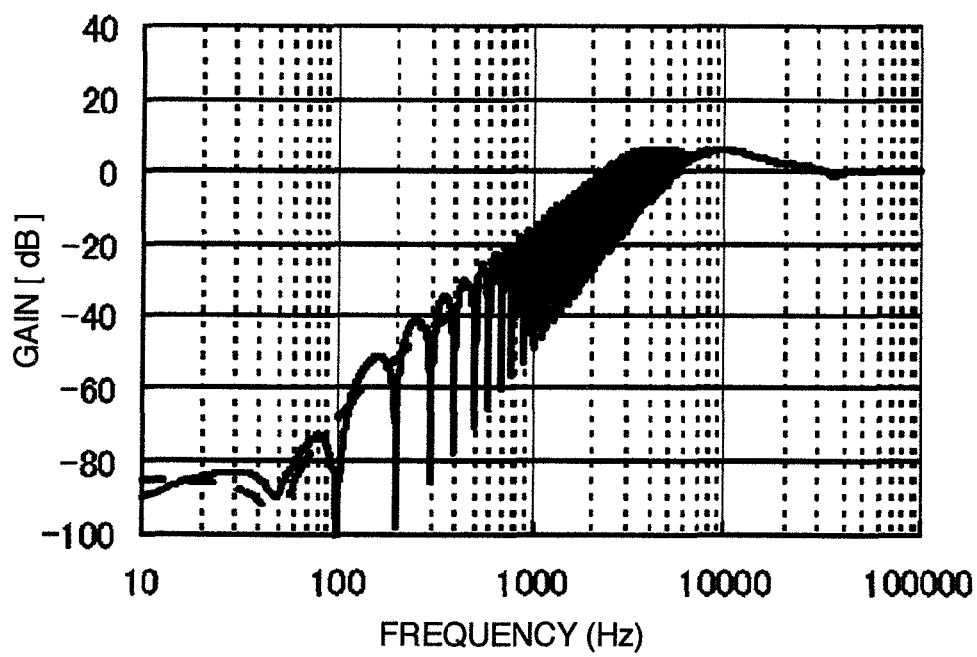
FIG. 18B is a graph of gain of a sensitivity function in the first embodiment.

FIGS. 18A and 18B graphically show gain of the sensitivity function respectively in the steady state and the characteristic changeover state according to the present embodiment.

In the graphs, a broken line indicates a gain characteristic of the sensitivity function when the iterative learning control is not employed.

As can be seen from FIGS. 18A and 18B, when the iterative learning control is employed, the gain of the sensitivity function abruptly lowers for a frequency which is an integral multiple of the rotary period. Hence, as compared with a case in which the iterative learning control is not employed, the gain of the sensitivity function lowers for a frequency which is an integral multiple of the rotary period. When the value of K becomes greater, the gain of the sensitivity function much more lowers for a frequency which is an integral multiple of the rotary period.

The sensitivity function is a transfer function from displacement of a track on the optical disk 101 to the following error. That is, the smaller the gain of the sensitivity function is, the greater the suppression effect is. In consideration of the suppression for the rotary synchronous component, the suppression degree is maximum for K=1, which results in appropriate suppression. The tracking error signal generator 405 generates, as the tracking error signal TE1, a voltage proportional to the following error. Hence, the deviation component contained in the signal TE1 has been depressed. That is, the signal TE1 is not suitable to detect a deviation.

On the other hand, the deviation detector 414 according to the present embodiment detects a deviation on the basis of the signal TE2 outputted from the adder 406.

Figure 19A:
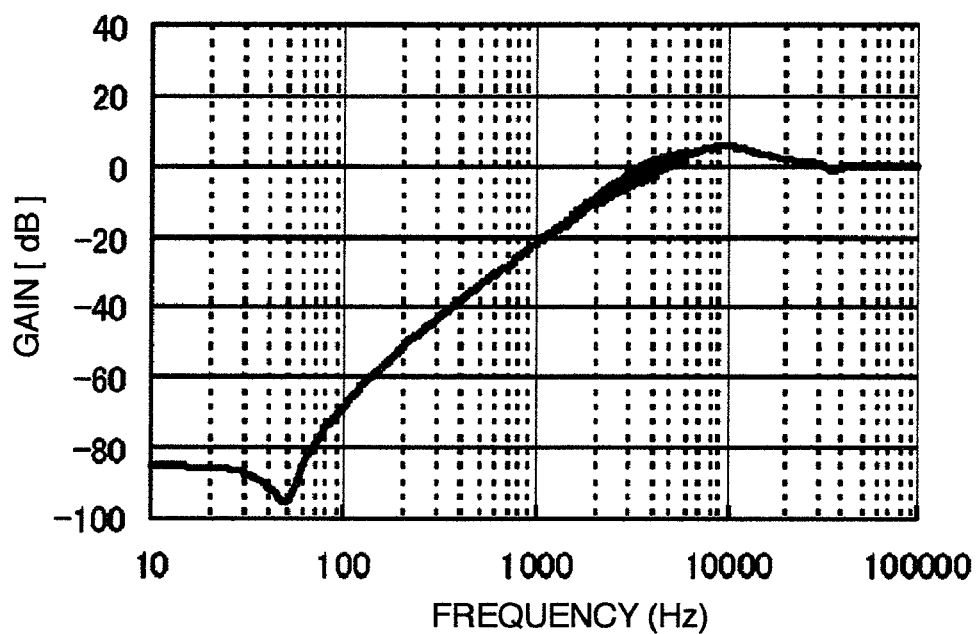
FIG. 19A is a graph of gain of a transfer function from track displacement on an optical disk to a signal TE2 in the first embodiment.
Figure 19B:
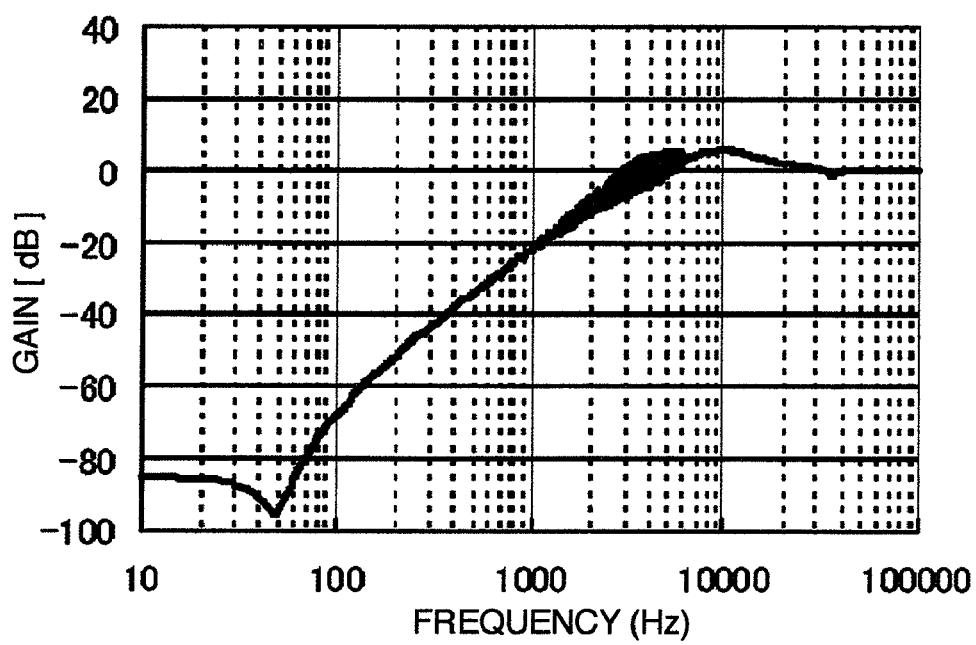
FIG. 19B is a graph of gain of a transfer function from track displacement on an optical disk to the signal TE2 in the first embodiment.

FIGS. 19A and 19B graphically show gain of the transfer function from displacement of a track on the optical disk 101 to the signal TE2.

FIG. 19A shows the gain in the steady state and 19B show the gain in the characteristic changeover states. In the description below, the transfer function from the track displacement on the optical disk 101 to the signal TE2 is represented as M(s).

Figure 20A:
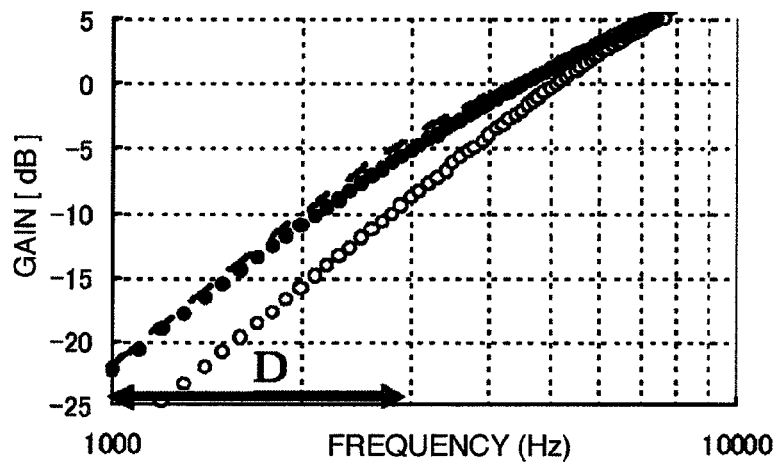
FIG. 20A is a graph of gain of a transfer function from track displacement on an optical disk to the signal TE2 with respect to a rotary period in the first embodiment.
Figure 20B:
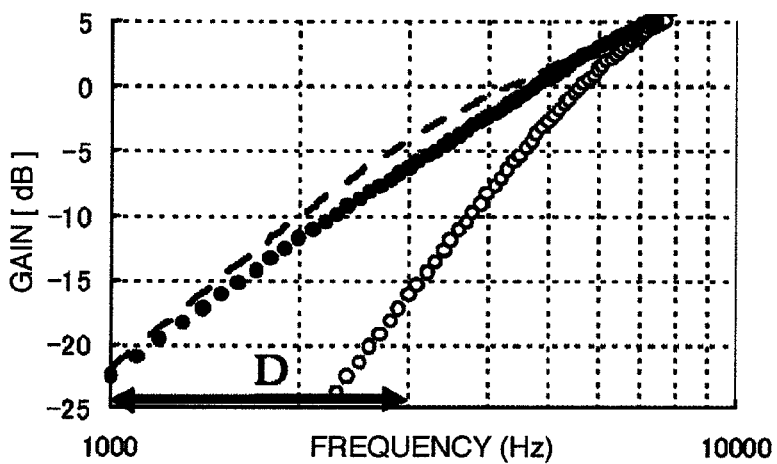
FIG. 20B is a graph of gain of a transfer function from track displacement on an optical disk to the signal TE2 with respect to a rotary period in the first embodiment.
Figure 20C:
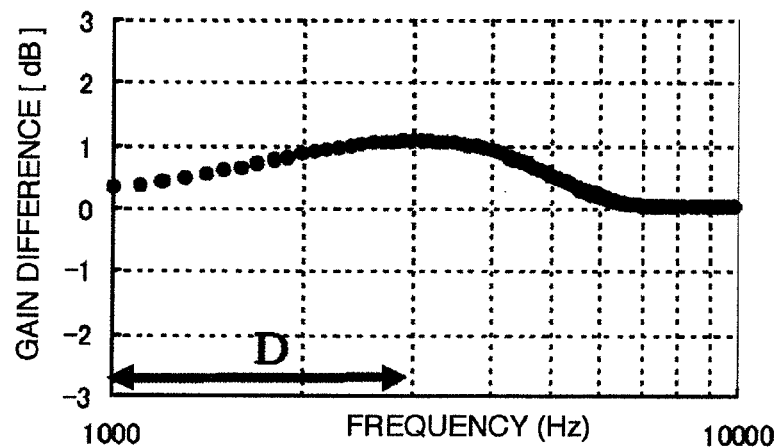
FIG. 20C is a graph of gain of a transfer function from track displacement on an optical disk to the signal TE2 with respect to a rotary period in the first embodiment.

As can be seen from FIGS. 19A and 19B, in the steady and characteristic changeover states, the gain characteristic of M(s) is less in the gain variation than the gain characteristic of the sensitivity function. In addition, the deviation component can be represented through Fourier transform as a sum of the rotary period component and its higher-order components as described above. Hence, it is necessary to pay attention only to the rotary period component and its higher-order components. Referring to FIGS. 20A to 20C, description will be given of the gain of M(s) for the rotary period component and its higher-order components.

FIGS. 20A and 20B graphically show the gain in the steady and characteristic changeover states. In FIGS. 20A and 20B, a broken line indicates the gain of the sensitivity function when the iterative learning control is not employed, a solid circle is the gain of M(s) for the rotary period component and its higher-order components, and an empty circle, shown for comparison, is the gain of the sensitivity function for the rotary period component and its higher-order components.

As already described, the frequency range D in which a deviation is present ranges from 1 kHz to 3 kHz in the present embodiment. In the frequency range D, the gain of M(s) for the rotary period component and its higher-order components is substantially equal to the gain of the sensitivity function when the iterative learning control is not employed.

In the embodiment, it is assumed that the following error is large when the steady-state characteristic is used. That is, for the gain of the sensitivity function indicated by the broken line in FIGS. 20A to 20C, a case in which the suppression is not sufficient is taken into consideration. Hence, a deviation component having sufficient amplitude is not suppressed and remains in the signal TE2 obtained when the iterative learning control is not employed.

On the other hand, the solid circle indicates the gain of the transfer function from the track displacement on the optical disk 101 to the signal TE2. The gain of the transfer function is substantially equal in the value to the gain represented by the broken line. That is, according to the embodiment, a deviation component having sufficient amplitude is not suppressed and remains in the signal TE2 in both of the steady and characteristic changeover states.

FIG. 20C shows the difference in the gain of M(s) for the rotary period component and its higher-order components between the steady state (solid circles in FIG. 20A) and the characteristic changeover state (solid circles in FIG. 20B).

Assuming that the deviation component can be represented by the sum of the components in the frequency range D, the deviation component contained in the signal TE2 has substantially equal amplitude or almost fixed amplitude in the steady state and the characteristic changeover state. The difference in the amplitude of the deviation component between these states varies with respect to the frequency, but is at most about 1 dB. The threshold value $V_{time}$ to detect the deviation in the deviation detection information generator 1202 can be commonly used in the steady and characteristic changeover states to detect a deviation area.

According to the configuration of the embodiment, in the steady state in which the value K of the variable gain element 413 is 0.5 as well as in the characteristic changeover state in which the value K is 1, the amplitude of the deviation component contained in the signal TE2 has substantially an equal or fixed amplitude value, the amplitude having a sufficient amplitude value for operation. It is possible that at detection of the start point of a deviation area, the servo characteristic is changed to increase the suppression degree for a deviation. The end point of the deviation area is detected while following a track with the servo characteristic having the increased suppression degree for a deviation, to thereby restore the servo characteristic to the steady-state characteristic.

In the information recording or reproducing operation, the present optical disk device gradually moves the position of the pickup 403 relative to the optical disk 401. According to the state whether or not a deviation is detected, the optical disk device changes the characteristic of compensation for the tracking error signal. Specifically, when the radial position of the optical disk 401 for the recording or reproducing operation is changed from a radial position at which no deviation is detected to a radial position at which a deviation is detected, the disk device changes the compensation characteristic from the steady-state characteristic to the changeover characteristic. Reversely, when the radial position of the optical disk 401 for the recording or reproducing operation is changed from a radial position at which a deviation is detected to a radial position at which no deviation is detected, the disk device changes the compensation characteristic from the changeover characteristic to the steady-state characteristic. In the embodiment, a deviation is detected on the basis of a tracking error signal (TE2) for which predetermined compensation has been conducted.

The optical disk device may be configured to store in a memory, not shown, the radial position at which presence or absence of a deviation is detected. Also, the disk device may be configured to change the compensation characteristic based on the radial position stored in the memory.

Figure 21:
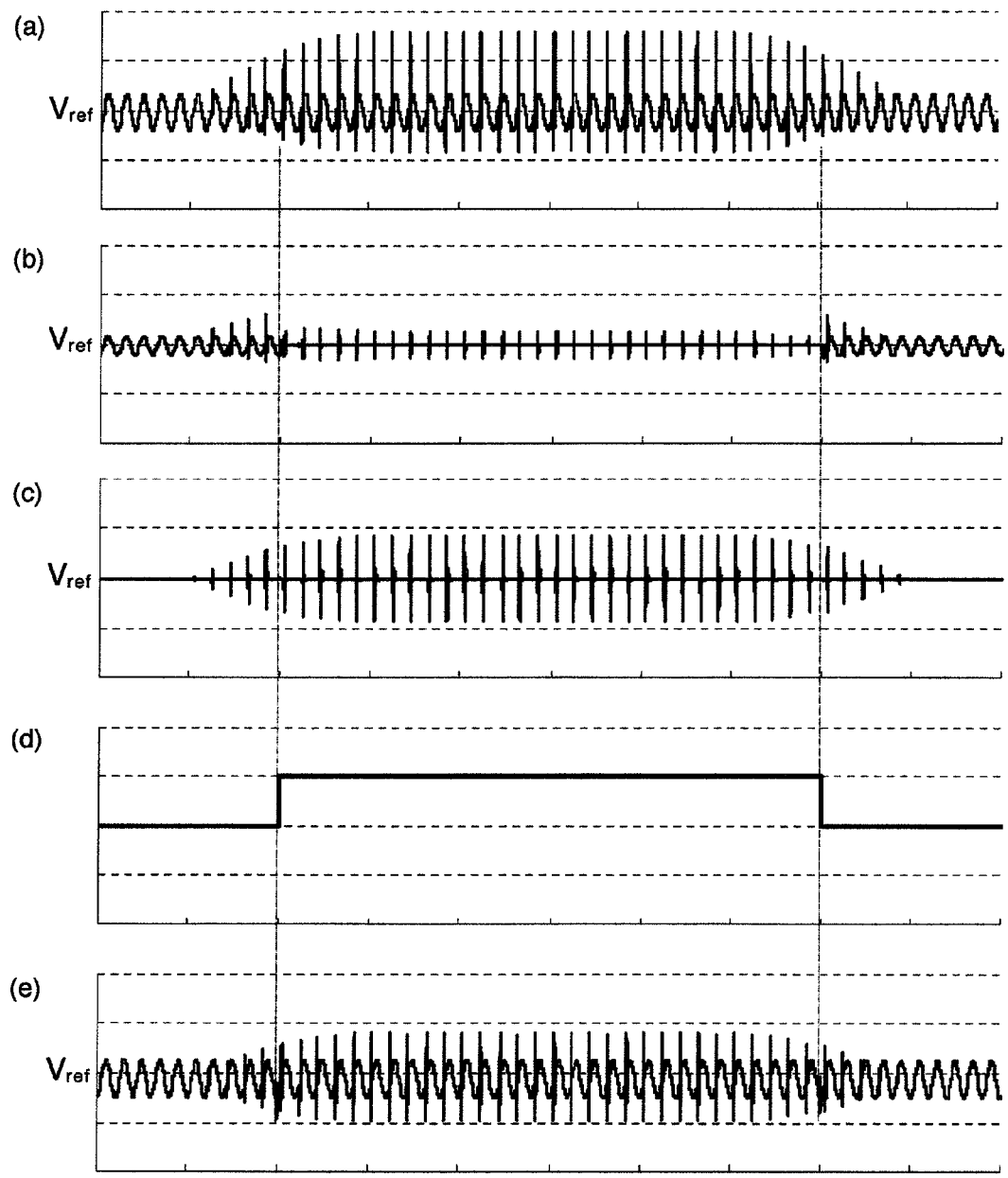
FIG. 21 is a diagram graphically showing simulation results of the first embodiment.

An advantage of the embodiment will be described by referring to simulation results shown in FIG. 21. In FIG. 21, (a) is a comparative graph showing the signal TE2 when no deviation is detected, and (b) to (e) are results of simulation according to the embodiment. Specifically, (b) is the signal TE1, (c) indicates the signal DEVIEXT, (d) is the signal DEVIDET, and (e) is the signal TRD.

As FIG. 21 shows, also during the period of the character changeover state set by changing the value K of the variable gain element 413 after detection of the first point of a deviation area, the deviation component has substantially equal amplitude in the signal DEVIEXT obtained by extracting the deviation component through the band-pass filter 1201. Hence, also when an end point of the deviation area is passed, it is possible to detect the end point.

The signal TRD is obtained by passing the signal TE2 through the tracking controller 407 having the frequency characteristic. Hence, the amplitude of the deviation component in the signal TRD has substantially equal amplitude value in both of the steady and character changeover states.

Due to the above operation of the optical disk device according to the embodiment, it is possible that at detection of the start point of a deviation area, the servo characteristic is changed to increase the suppression degree for a deviation. The end point of the deviation area is detected while following a track with the servo characteristic having the increased suppression degree for a deviation, and the servo characteristic is restored to the steady-state characteristic. This accordingly improves the following performance for a deviation.

Second Embodiment

Description will now be given of a second embodiment.

In the configuration of the first embodiment, the deviation detector 414 receives the signal TE2 outputted from the adder 406. The deviation detector 414 of the first embodiment includes a band-pass filter 1201 having a frequency characteristic shown in FIG. 13.

At detection of a deviation, the deviation detector 414 increases the learning degree of the iterative learning control to suppress a deviation component. Hence, in the band-pass filter 1201, it is favorable that attenuation of the high-frequency component matches a frequency band for which the repetitive learning system has suppression effect.

In the signal REPOUT produced from the repetitive learning system, the high-frequency component has been attenuated by the low-pass filters 410 and 412 of the repetitive learning system. Hence, it is favorable that the attenuation of the high-frequency component through the band-pass filter 1201 is equivalent in the attenuation effect to the attenuation through the low-pass filters 410 and 412.

On the other hand, when the low-pass filter 410 or 412 is a high-order filter, it is required that the band-pass filter 1201 is also a high-order filter. This possibly results in increase in the cost.

In contrast therewith, according to the present embodiment, while keeping a low cost, it is possible to match the attenuation of the high-frequency component in the deviation detector with the band in which the repetitive learning system has the suppression effect.

Figure 22:
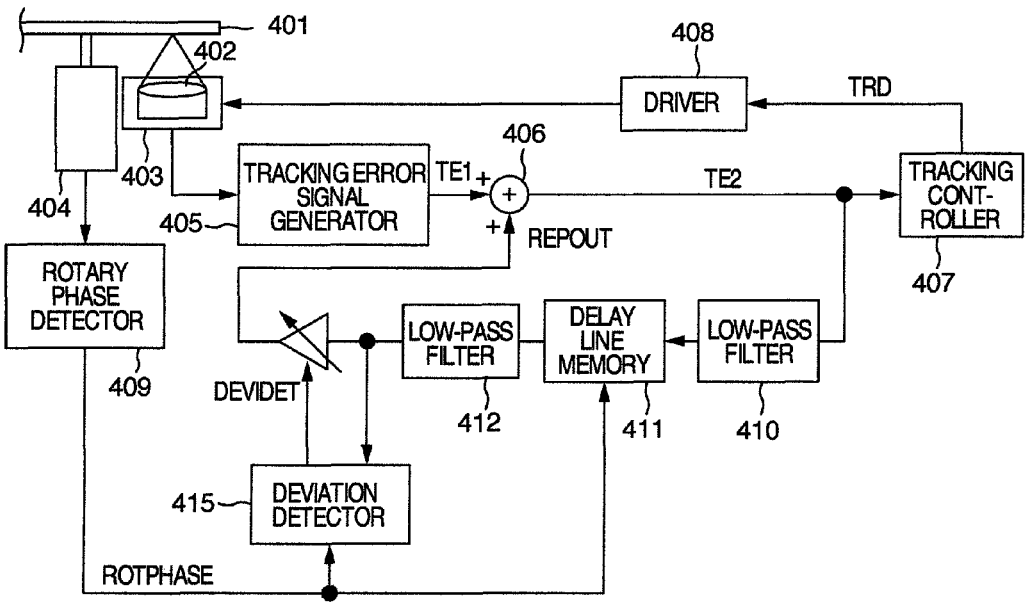
FIG. 22 is a block diagram showing an optical disk device in a second embodiment.

FIG. 22 shows an optical disk device of the second embodiment in a block diagram.

In FIG. 22, the same constituent components as those of the first embodiment shown in FIG. 4 are assigned with the same reference numerals, and description thereof will be avoided. The second embodiment differs from the first embodiment in the internal configuration of the deviation detector and the input signal thereto.

Reference numeral 415 is a deviation detector. The detector 415 receives an output signal from the low-pass filter 412 and information ROTPHASE to detect a deviation and resultantly produces a deviation detection signal DEVIDET.

Referring now to the block diagram of FIG. 23, description will be given of a specific configuration of the deviation detector 415.

Figure 23:
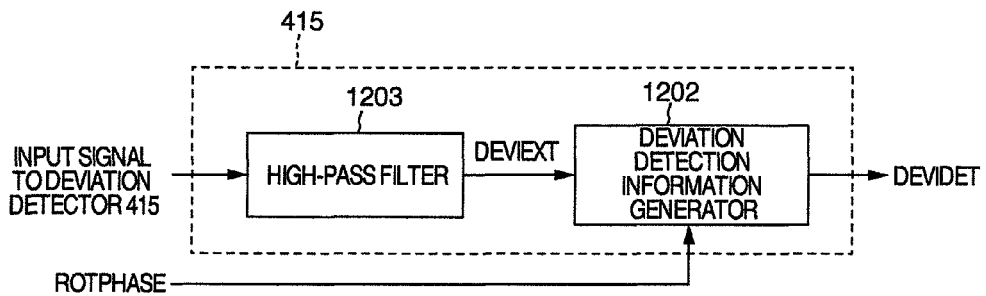
FIG. 23 is a block diagram showing a configuration of a deviation detector in the second embodiment.

In FIG. 23, reference numeral 1202 indicates the same constituent component as the deviation information generator of the first embodiment, and description thereof will be avoided.

Reference numeral 1203 is a high-pass filter. The filter 1203 receives an input signal to the deviation detector 415 and attenuates a rotary period component and its second-order and third-order components to produce a signal DEVIEXT.

As FIG. 22 shows, since the input signal to the deviation detector 415 has passed the low-pass filters 410 and 412, the high-frequency noise component has been attenuated. Also, the input signal to the deviation detector 415 has been attenuated at a similar degree as the signal REPOUT from the repetitive learning system. Therefore, when the deviation is detected by using the output signal from the low-pass filter 412 as in the configuration of the second embodiment, the deviation detector 415 needs not to attenuate the high-frequency component.

Hence, in the second embodiment, the deviation detector 415 needs to attenuate only the rotary period component and its second-order and third-order components. The high-pass filter 1203 is employed to attenuate the high-frequency component.

As can be seen from FIG. 13, the frequency range D is apart in the frequency from the frequencies ranging from the rotary period to a frequency obtained by multiplying the rotary period by three. Hence, to attenuate the rotary period component and its second-order and third-order components, it is only necessary to employ a low-order filter.

In the second embodiment, the signal DEVIEXT from the high-pass filter 1203 is equivalent to the signal DEVIEXT of the first embodiment. Hence, the advantage described for the first embodiment is also retained in the second embodiment.

Therefore, in the optical disk device according to the second embodiment, it is possible to configure the low-pass filter 1203 comprised in the deviation detector 415 by use of a low-order filter.

As above, according to the optical disk device of the second embodiment, the following performance for the deviation is improved and the increase in the cost can be suppressed.

Third Embodiment

Next, description will be given of a third embodiment.

Figure 24:
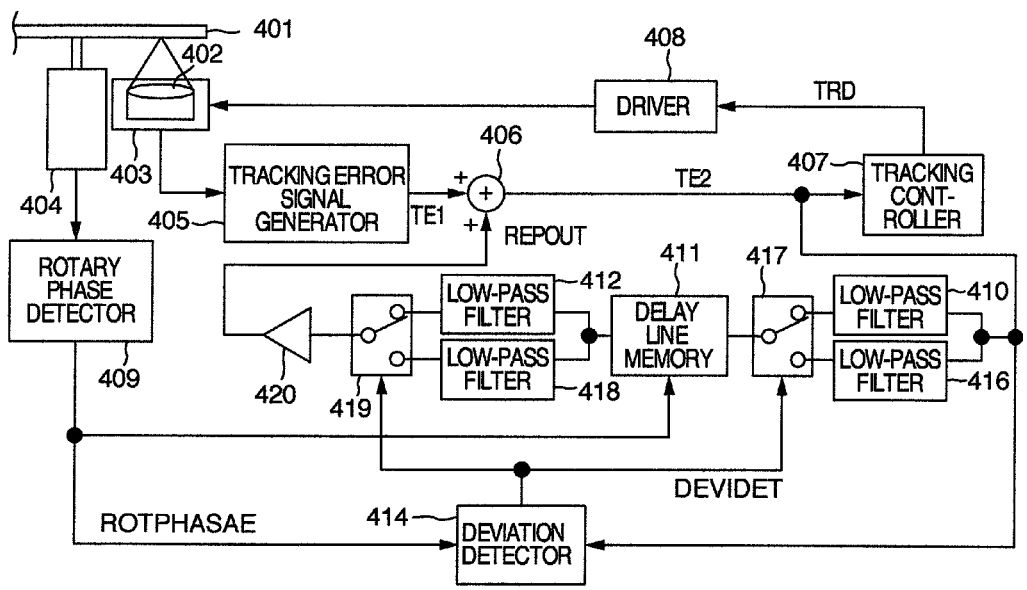
FIG. 24 is a block diagram showing a configuration of a deviation detector in a third first embodiment.

FIG. 24 shows an optical disk device according to the third embodiment.

In FIG. 24, the same constituent components as those of the first embodiment shown in the block diagram of FIG. 4 are assigned with the same reference numerals. Hence, description of the components will be avoided.

Reference numeral 416 indicates a third low-pass filter, which attenuates a high-frequency component contained in the signal TE2. The filter 416 has a cutoff frequency equal to or more than that of the first low-pass filter 410.

Reference numeral 417 indicates a first selector, which receives the output signals respectively from the first and third low-pass filters 410 and 416 to select either one thereof and outputs the selected signal. The first selector 417 selects the signal based on the deviation detection signal (DEVIDET) from the deviation detector 414.

In the third embodiment, the delay line memory 411 receives an output signal from the first selector 417 based on the information ROTPHASE to store therein a value of the signal by dividing one rotation of the spindle motor 404 by N. On the basis of the stored value, the delay line memory 411 outputs, at timing synchronized with the rotation, a signal to compensate periodic disturbance inputted to the servo system.

Reference numeral 418 is a fourth low-pass filter, which attenuates a high-frequency component of the output signal from the delay line memory 411. The fourth low-pass filter has a cutoff frequency equal to or more than that of the second low-pass filter 412. Reference numeral 419 indicates a second selector, which receives the output signals respectively from the second and fourth low-pass filters 412 and 418 to select either one thereof and outputs the selected signal. The second selector 419 selects the signal based on the deviation detection signal (DEVIDET) from the deviation detector 414.

Reference numeral 420 indicates a gain element, which multiplies the output signal from the second selector 419 by a predetermined coefficient K to output the resultant signal as a compensation signal (REPOUT). The coefficient K ranges from zero to one.

Next, description will be given of operation of the first selector 417. According to a level of the signal DEVIDET, the first selector 417 changes the signal to be outputted. When the signal DEVIDET is at a low level, the selector 417 outputs the output signal received from the first low-pass filter 410. When the signal DEVIDET is at a high level, the selector 417 outputs the output signal received from the third low-pass filter 416.

Similarly, the second selector 419 changes its output signal according to the level of the signal DEVIDET. When the signal DEVIDET is at a low level, the selector 419 outputs the output signal obtained from the second low-pass filter 412. When the signal DEVIDET is at a high level, the selector 419 outputs the output signal obtained from the fourth low-pass filter 418.

In the description below, the state in which the signal DEVIDET is at a low level is referred to as a steady state, and the state in which the signal DEVIDET is at a high level is referred to as a characteristic changeover state. In short, the state in which the repetitive learning system uses the first and second low-pass filters 410 and 412 is the steady state. The state in which the repetitive learning system uses the third and fourth low-pass filters 416 and 417 is the characteristic changeover state.

As described above, the cutoff frequency of the third low-pass filter 416 is equal to or more than that of the first low-pass filter 410. Similarly, the cutoff frequency of the fourth low-pass filter 418 is equal to or more than that of the second low-pass filter 412.

Description will now be given of an advantage of the third embodiment.

As can be seen from FIGS. 17A and 17B associated with the first embodiment, the phase characteristic of the iterative learning control varies centered on 0 deg. For high frequencies equal to or more than the cutoff frequency of the low-pass filters (410 and 412) of the iterative learning control system, the amplitude of the compensation signal (REPOUT) is attenuated. This resultantly reduces the variation in the phase.

In a state in which the iterative learning control system has an ideal characteristic, for example, the low-pass filter of the iterative learning control system has a linear phase characteristic, the phase of the iterative learning control is 0 degree (deg) for a higher frequency of the rotary period. Hence, a frequency of which the phase characteristic varies centered on 0 deg is a frequency other than the higher frequency of the rotary period.

In consideration of stability of the overall feedback control system, when the cutoff frequency of the low-pass filters of the iterative learning control system is set to a large value, the phase margin is reduced for the frequency other than the higher-order frequencies of the rotary period. This leads to a fear that the stability of the feedback control system is deteriorated. Hence, the cutoff frequency of the iterative learning control system in the steady state is desirably determined in consideration of the stability of the feedback control system.

However, it is not easy to set the servo band to higher frequencies in the steady state. In the information recording and reproducing operations at a high operation speed, the frequency of the deviation shifts toward a higher frequency. As a result, when the iterative learning control characteristic in the steady state determined in consideration of stability of the feedback control system is employed, the deviation component is suppressed by the low-pass filters of the iterative learning control system. It is hence likely that the suppression of the deviation is not sufficient.

For the problem above, by paying attention to the suppression for the deviation as an object of the present specification, the suppression effect for the deviation can be improved by increasing the cutoff frequency of the low-pass filters of the iterative learning control system.

According to the third embodiment, the cutoff frequency of the low-pass filters of the iterative learning control system becomes higher in the deviation area. As a result, for the track following performance in the deviation area, when disturbance of a frequency other than the higher-order frequencies of the rotary period is inputted to the system, it is feared that the track following performance is deteriorated. However, for the deviation component whose presence has been determined, the following performance is improved. It is hence possible to avoid worst events, for example, an event of a track miss.

The optical disk device of the third embodiment detects a local radial area in which a deviation is present and then changes the servo characteristic only in the radial range. Hence, when the above characteristic not suitable as a steady-state characteristic is employed only in the local area, it is possible to effectively operate the feedback control system.

In the optical disk device according to the third embodiment, it is possible that at detection of the start point of a deviation area, the servo characteristic is changed to increase the suppression degree for a deviation. The end point of the deviation area is detected while following a track with the servo characteristic having the increased suppression degree for a deviation, to thereby restore the servo characteristic to the steady-state characteristic. It is hence possible to improve the following performance for the deviation.

Fourth Embodiment

Description will now be given of a fourth embodiment.

In the first to third embodiments, by detecting a deviation area, the characteristic of the iterative learning control system is changed to suppress the deviation component. In the fourth embodiment, the deviation component is suppressed in a scheme other than the iterative learning control.

Figure 25:
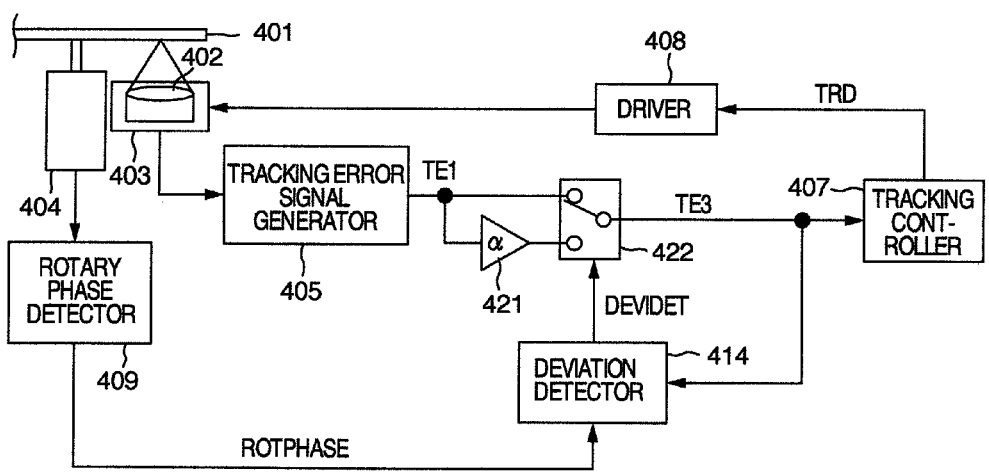
FIG. 25 is a block diagram showing a configuration of a deviation detector in a fourth first embodiment.

FIG. 25 shows an optical disk device of the fourth embodiment in a block diagram.

In FIG. 25, the same constituent components as those of the first embodiment shown in the block diagram of FIG. 4 are assigned with the same reference numerals, and description thereof will be avoided.

Reference numeral 421 indicates a gain element, which multiplies the signal TE1 from the tracking error signal generator 405 by a predetermined coefficient α to produce an output signal. The coefficient α is equal to or more than one.

Reference numeral 422 indicates a selector. The selector 422 receives the signal TE1 and the output signal from the gain element 421 to select either one thereof and outputs the selected signal as a signal TE3. The selector 422 selects the signal based on the deviation detection signal (DEVIDET) from the deviation detector 414.

In the fourth embodiment, the tracking controller 407 compensates the gain and the phase for the signal TE3 to produce a drive signal (TRD).

The deviation detector 414 of the fourth embodiment receives the signal TE3 and the information ROTPHASE and then detects a deviation to output a deviation detection signal (DEVIDET).

Description will now be given of an advantage of the fourth embodiment. In the description, the state in which the signal DEVIDET is at a low level is referred to as a steady state, and the state in which the signal DEVIDET is at a high level is referred to as a characteristic changeover state. The coefficient α of the gain element 421 is +3 dB (multiplying by about 1.41) as an example.

The deviation detector 414 of the fourth embodiment detects a deviation based on the signal TE3 from the selector 422. In the description below, the transfer function from the track displacement on the optical disk 101 to the signal T3 is represented as M(s).

Figure 26A:
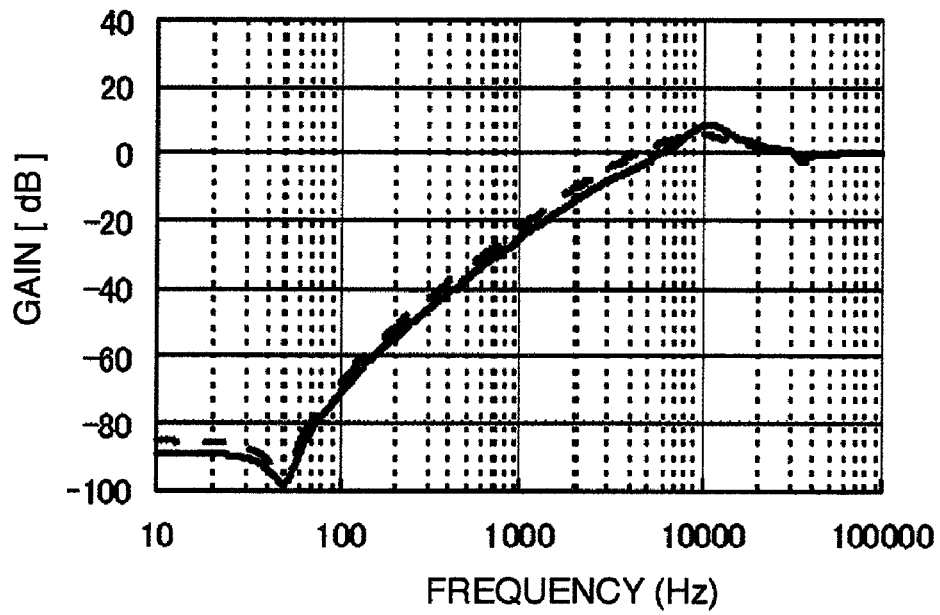
FIG. 26A is a graph showing gain of a sensitivity function and gain of a transfer function from track displacement on an optical disk to the signal TE2 in the fourth embodiment.

FIG. 26A graphically shows gain of a sensitivity function of the fourth embodiment. In the graphs, a broken line is a gain characteristic of the sensitivity function in the steady state. A solid line is a gain characteristic of the sensitivity function in the characteristic changeover state. In this way, according to the fourth embodiment, the gain of the sensitivity function uniformly lowers for frequencies less than the servo band. This is because the gain element 421 uniformly increases the servo gain by 3 dB.

The tracking error signal generator 405 produces the tracking error signal TE1 proportional to the following error. In the signal TE1, the deviation component has been depressed. Hence, the signal TE1 is not suitable for the detection of a deviation.

Figure 26B:
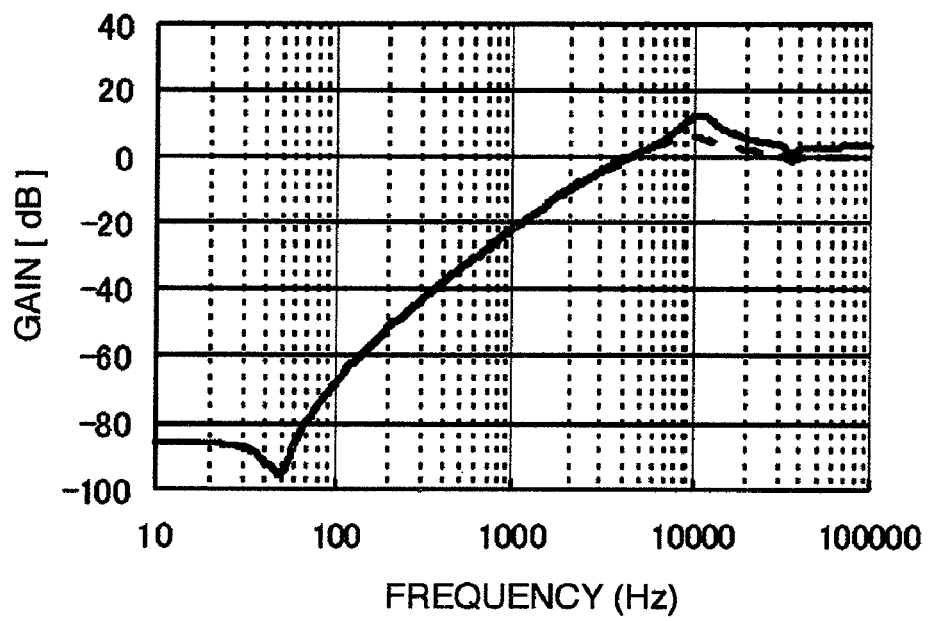
FIG. 26B is a graph showing gain of a sensitivity function and gain of a transfer function from track displacement on an optical disk to the signal TE2 in the fourth embodiment.

FIG. 26B graphically shows gain of the transfer function M(s) of the fourth embodiment. In the graphs, a broken line is a gain characteristic of M(s) in the steady state. A solid line is a gain characteristic of M(s) in the characteristic changeover state. In this fashion, the gain of M(s) in the characteristic changeover state is substantially equal to that in the steady state.

In the fourth embodiment, it is assumed that the following error takes a large value when the steady-state characteristic is employed. That is, the suppression is insufficient when the gain of the sensitivity function M(s) in the steady state shown in FIG. 26A is used. In the embodiment, since the selector 422 outputs the signal TE1 in the steady state, the broken line of FIG. 26A is substantially equal in the characteristic to the broken line of FIG. 26B.

Therefore, according to the fourth embodiment, in the steady state and the characteristic changeover state, the signal TE3 contains a deviation component which has sufficient amplitude and which has not been suppressed. The amplitude of the deviation component of the signal TE3 is kept almost unchanged or almost equal in the steady state and the characteristic changeover state. To detect a deviation area by the deviation detection information generator 1202, the threshold value $V_{time}$ to detect a deviation can be commonly used in the steady and characteristic changeover states.

Figure 27:
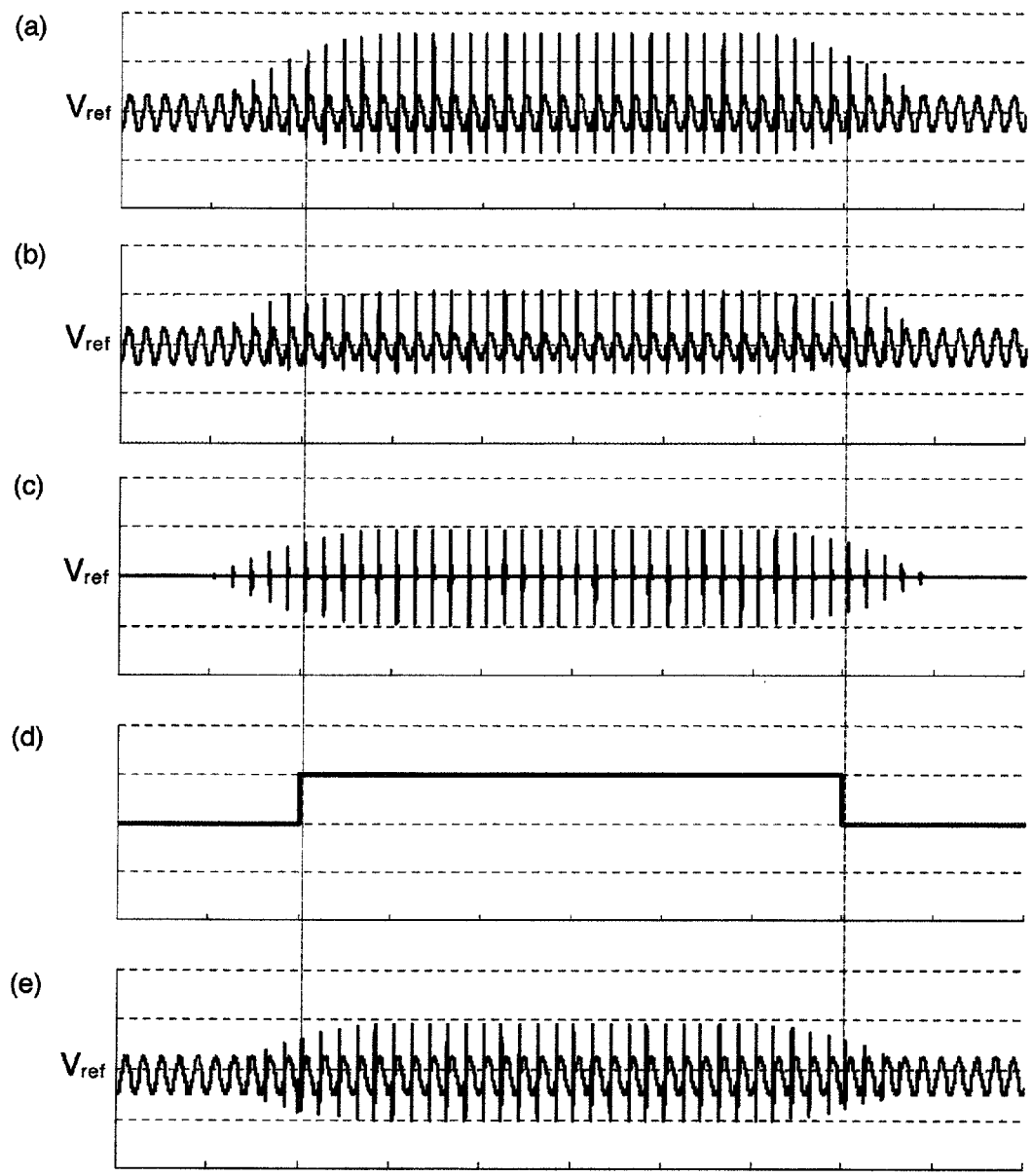
FIG. 27 is a diagram graphically showing simulation results of the fourth embodiment.

Next, description will be given of an advantage of the fourth embodiment by referring to simulation results graphically shown in FIG. 27. In FIG. 27, (a) is a graph for comparison, i.e., the signal TE1 when no deviation is detected. Graphs (b) to (e) show simulation results of the fourth embodiment. Specifically, (b) is the signal TE1 of the fourth embodiment, (c) is the signal DEVIEXT, (d) is the signal DEVIDET, and (e) is the signal TRD.

As can be seen from FIG. 27, also during the character changeover state established after the selector 422 conducts a changeover operation due to detection of the first point of a deviation area, the amplitude of the deviation component is substantially kept unchanged in the signal DEVIEXT obtained by extracting a deviation component from the signal TE3 through the band-pass filter 1201. Hence, when an end point of the deviation area is passed, it is also possible to detect the end point of the deviation area.

The signal TRD is obtained by processing the signal TE3 according to the frequency characteristic of the tracking controller 407. Hence, the amplitude of the deviation component of the signal TRD has also substantially an equal amplitude value in the steady state and the character changeover state in which K=1.

Due to the above operation of the optical disk device of the fourth embodiment, it is possible that at detection of the start point of a deviation area, the servo characteristic is changed to increase the suppression degree for a deviation. The end point of the deviation area is detected while following a track with the servo characteristic having the increased suppression degree for a deviation, to thereby restore the servo characteristic to the steady-state characteristic. Hence, the following performance for the deviation can be improved.

Fifth Embodiment

Description will now be given of a fifth embodiment.

The fifth embodiment is a variation of the fourth embodiment in which the selector 422 is used to uniformly increase the servo gain.

Figure 28:
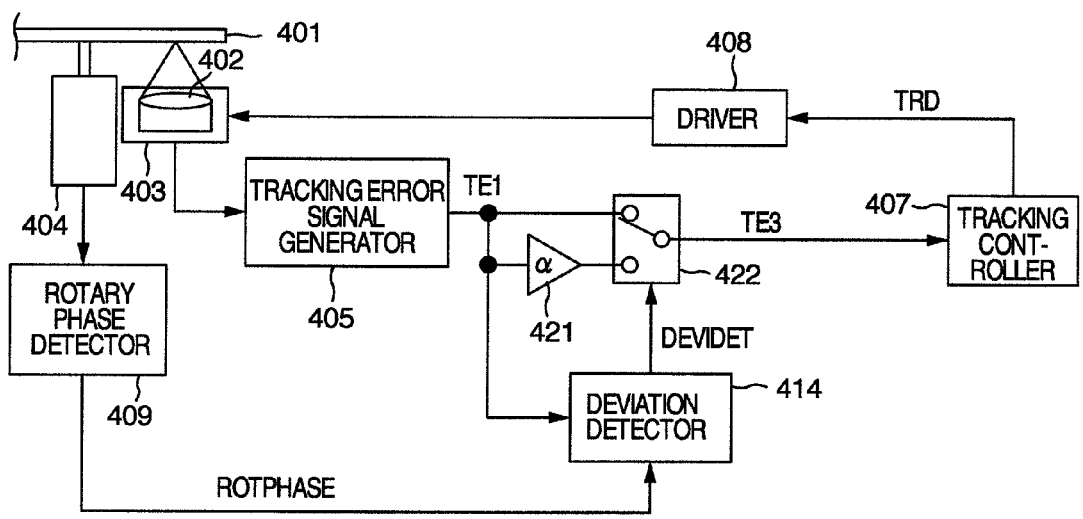
FIG. 28 is a block diagram showing an optical disk device in a fifth embodiment.

FIG. 28 shows an optical disk device of the fifth embodiment in a block diagram.

In FIG. 28, the same constituent components as those of the fourth embodiment of FIG. 25 are assigned with the same reference numerals, and description thereof will be avoided.

Reference numeral 423 indicates a deviation detector. The detector 423 receives the signal TE1 from the tracking error signal generator 405 and information ROTPHASE to detect a deviation and then produces a deviation detection signal (DEVIDET).

Figure 29:
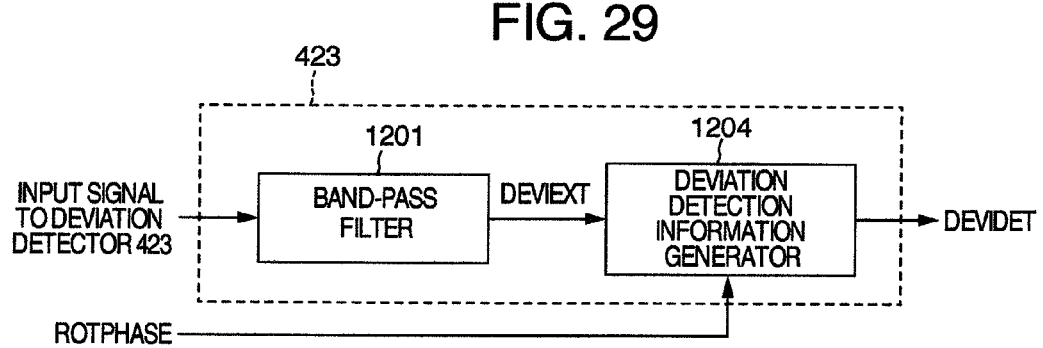
FIG. 29 is a block diagram showing a configuration of a deviation detector in the fifth embodiment.

Referring to FIG. 29, description will be given of a configuration of the deviation detector 423 of the fifth embodiment. In FIG. 29, reference numeral 1201 is a band-pass filter substantially equal to that of the first embodiment, and description thereof will be avoided.

Reference numeral 1204 indicates a deviation detection information generator. The generator 1204 receives the signal DEVIEXT and the information ROTPHASE and then detects whether or not a deviation is detected during one rotation of the spindle motor 404 to resultantly produce a deviation detection signal (DEVIDET).

Figure 30:
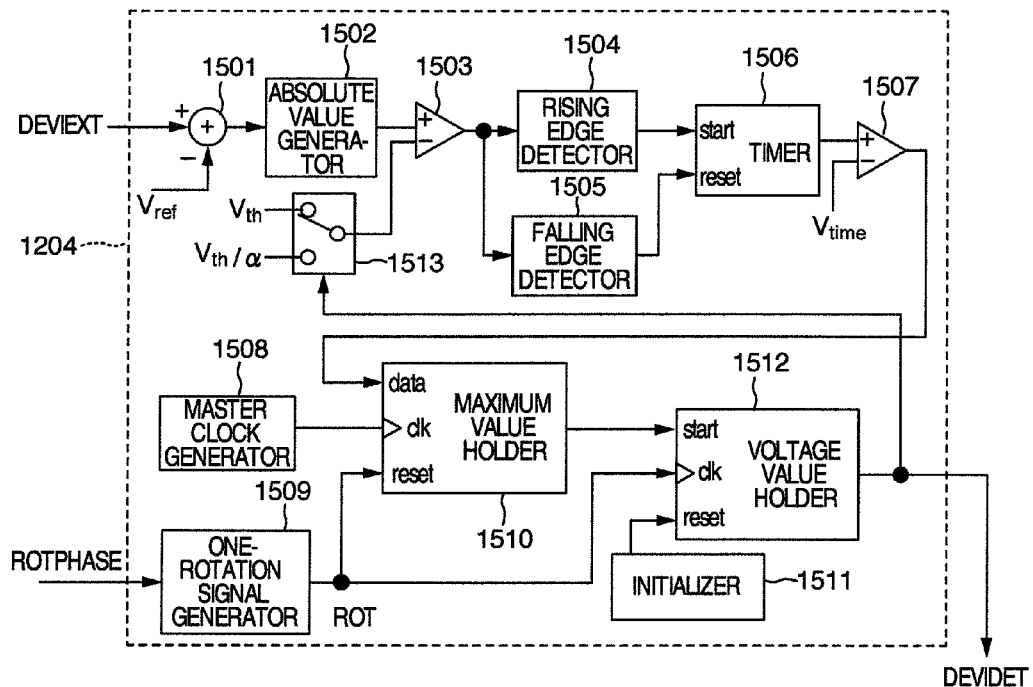
FIG. 30 is a block diagram for explaining a configuration of the deviation detection information generator in the fifth embodiment.

Referring next to FIG. 30, description will be given of a configuration of the deviation detection information generator 1204 according to the fifth embodiment. In FIG. 30, the same constituent components as those of the first embodiment of FIG. 15 are assigned with the same reference numerals, and description thereof will be avoided.

Reference numeral 1513 indicates a selector to select a signal based on the deviation detection signal (DEVIDET) from the voltage holder 1512. The selector 1513 outputs a voltage value of $V_{th}$ when DEVIDET is at a low level and a voltage value of $V_{th}/\alpha$ when DEVIDET is at a high level.

In the configuration, when the signal DEVIDET is at a high level, the detection threshold value is multiplied by $1/\alpha$ in the deviation detection information generator 1204.

As FIG. 26A shows, in a situation in which the selector 422 conducts a changeover operation to select a signal from the gain element 421, when the value from the gain element 421 indicates "multiply by $\alpha$", the gain of the sensitivity function is multiplied by $1/\alpha$ in the low-frequency band.

That is, in the configuration in which the servo gain is uniformly increased, the deviation component of the signal TE1 in the character changeover state has amplitude which is obtained by multiplying the amplitude of the deviation component of the signal TE1 in the steady state by $1/\alpha$.

Therefore, by also multiplying the detection threshold value by $1/\alpha$, a deviation is detected by use of the signal TE1 according to the fifth embodiment, which is equivalent in operation to the fourth embodiment.

Due to the above operation of the optical disk device of the fifth embodiment, it is possible that at detection of the start point of a deviation area, the servo characteristic is changed to increase the suppression degree for a deviation. The end point of the deviation area is detected while following a track with the servo characteristic having the increased suppression degree for a deviation, to thereby restore the servo characteristic to the steady-state characteristic. Hence, the following performance for the deviation can be improved.

Sixth Embodiment

Next, description will be given of a sixth embodiment according to the present invention.

In the configuration of the fourth embodiment, the selector 422 is employed to uniformly increase the servo gain. However, it is required to increase the servo gain in the frequency region in which a deviation is present. It is not necessarily required to increase the servo gain in the overall frequency band. The sixth embodiment is a variation configured in consideration of this point.

Figure 31:
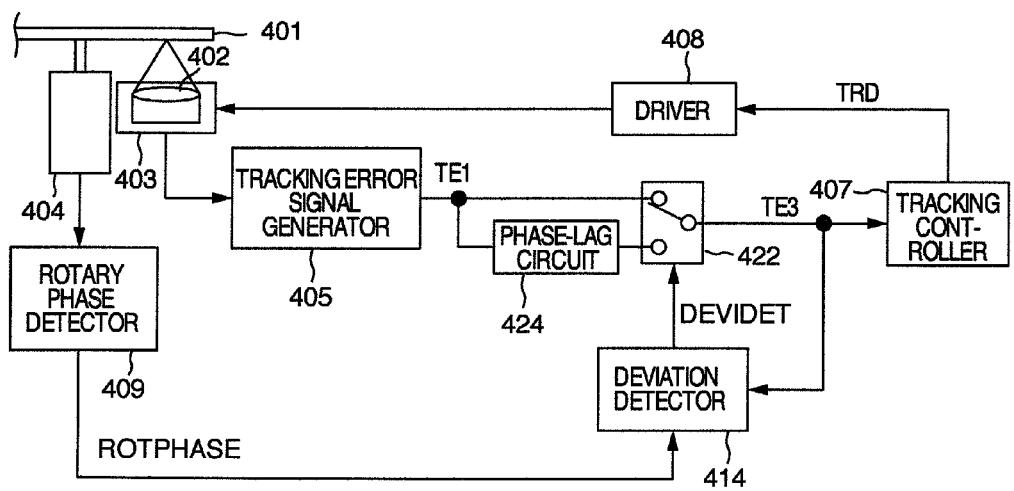
FIG. 31 is a block diagram showing an optical disk device in a sixth embodiment.

FIG. 31 shows an optical disk device according to the sixth embodiment in a block diagram.

In FIG. 31, the same constituent components as those of the fourth embodiment shown in FIG. 25 are assigned with the same reference numerals, and description thereof will be avoided.

Reference numeral 424 indicates a phase lag circuit, which compensates the gain and the phase for the signal TE1 from the tracking error signal generator 405.

The tracking controller 407 of the sixth embodiment is substantially equal to that of the first embodiment shown in FIG. 8.

Hence, in the configuration of the sixth embodiment, when the signal DEVIDET is at a high level, two phase lag compensators are employed. As a result, the number of open-loop transfer functions is increased in a low-frequency band.

Therefore, the deviation component is suppressed and the following performance is improved. The deviation component in the signal TE1 is reduced in amplitude. However, in the signal TE3, a deviation component having sufficient amplitude is not suppressed and remains in the steady and characteristic changeover states. The amplitude in the steady state is almost equal to that in the characteristic changeover state.

Therefore, also in the sixth embodiment, it is possible that at detection of the start point of a deviation area, the servo characteristic is changed to increase the suppression degree for a deviation. The end point of the deviation area is detected while following a track with the servo characteristic having the increased suppression degree for a deviation, to thereby restore the servo characteristic to the steady-state characteristic. Hence, the following performance for the deviation can be improved.

Seventh Embodiment

Description will now be given of a seventh embodiment.

In the configuration of the first embodiment, the value K of the variable gain element 413 is increased to suppress the deviation. However, in this situation, when the gain of the iterative learning control becomes greater, the quantity of variation in the phase characteristic becomes greater with respect to the frequency other than a higher-order frequency of the rotary period as shown in FIGS. 17A and 17B.

When disturbance of a frequency other than the higher-order frequency of the rotary period is inputted while a deviation area is being passed, the following performance is lowered in this state than in the steady state depending on cases. This problem does not take place if the cutoff frequency of the low-pass filters in the iterative learning control system is sufficiently lower than the servo band.

The seventh embodiment is configured to enhance stability in operation while a deviation area is being passed. Specifically, the optical disk device of the seventh embodiment continues its control operation in a stable state even if disturbance of a frequency other than the higher-order frequency of the rotary period is inputted while a deviation area is being passed. Description will be given in more detail of the operation.

Figure 32:
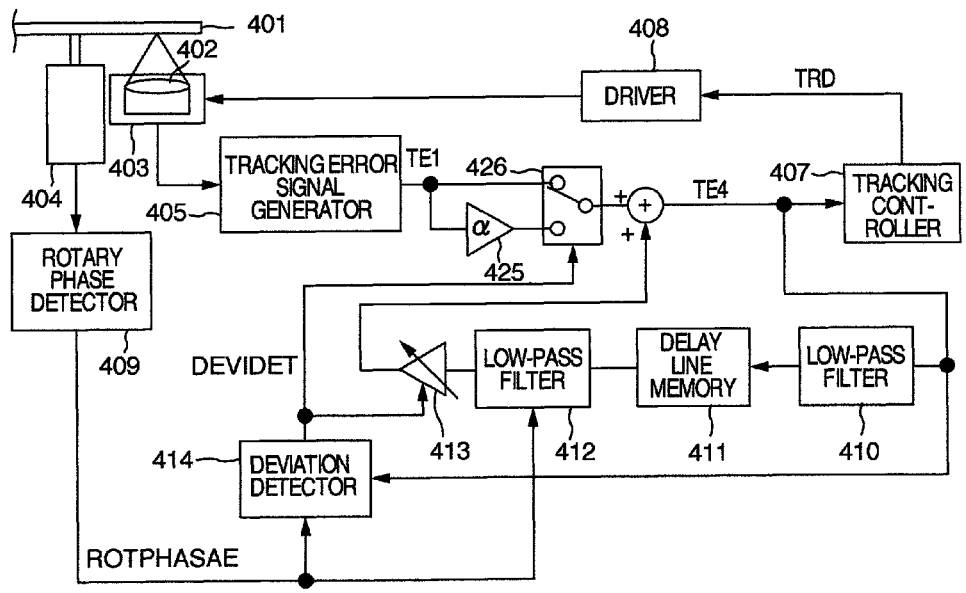
FIG. 32 is a block diagram showing an optical disk device in a seventh embodiment.

FIG. 32 shows an optical disk device of the seventh embodiment in a block diagram.

In FIG. 32, the same constituent components as those of the first embodiment shown in FIG. 4 are assigned with the same reference numerals, and description thereof will be avoided.

Reference numeral 425 indicates a gain element, which multiplies the signal TE1 from the tracking error signal generator 405 by a predetermined coefficient $\alpha$ to produce an output signal. The coefficient $\alpha$ is equal to or more than one.

Reference numeral 426 is a selector, which receives the signal TE1 and the output signal from the gain element 425 and selects one of the signals to output the selected signal. The selector 426 selects the signal on the basis of the deviation detection signal (DEVIDET) from the deviation detector 414.

In the seventh embodiment, the adder 406 adds the output signal from the selector 426 to the compensation signal (REPOUT) from the variable gain element 113 to produce a signal TE4.

The tracking controller 407 compensates the gain and the phase for the signal TE4 to produce a drive signal TRD.

The deviation detector 414 receives the signal TE4 and information ROTPHASE to detect a deviation and then produces a deviation detection signal (DEVIDET).

Resultantly, when the signal DEVIDET is at a high level, the value K of the variable gain element 413 of the iterative learning control system becomes larger and the selector 425 uniformly increases the gain $\alpha$ of the feedback control system. In short, the seventh embodiment is a combination of the first and fourth embodiments.

Description will now be given of an advantage of the seventh embodiment. As described above, when the value K of the variable gain element 413 of the iterative learning control system becomes larger, the phase characteristic of the iterative learning control varies in a frequency band less than the servo band. This results in a problem of existence of a frequency which causes a phase lag for the open-loop transfer function in the frequency band less than the servo band.

In this situation, when the value K of the variable gain element 413 becomes greater and the selector 425 uniformly increases the gain a of the feedback control system, the gain of the open-loop transfer function becomes greater in the frequency band less than the servo band. Hence, stability of operation is enhanced for the frequency band.

Therefore, according to the seventh embodiment, it is possible to improve stability of the feedback control system when disturbance of a frequency other than the higher-order frequency of the rotary period is inputted while a deviation area is being passed.

Eighth Embodiment

In the configurations of the first to seventh embodiments, disturbance (a deviation) is detected by use of a signal immediately after the characteristic change section 105 in the general feedback control system shown in the block diagram of FIG. 1.

However, as can be seen from the simulation results shown in FIGS. 21 and 27, the amplitude of the deviation component in a signal, e.g., the signal TRD is substantially equal in the steady state and the characteristic changeover state.

Hence, it is also possible to detect a deviation by use of the signal TRD. In the eighth embodiment, the deviation is detected by using the signal TRD.

Figure 33:
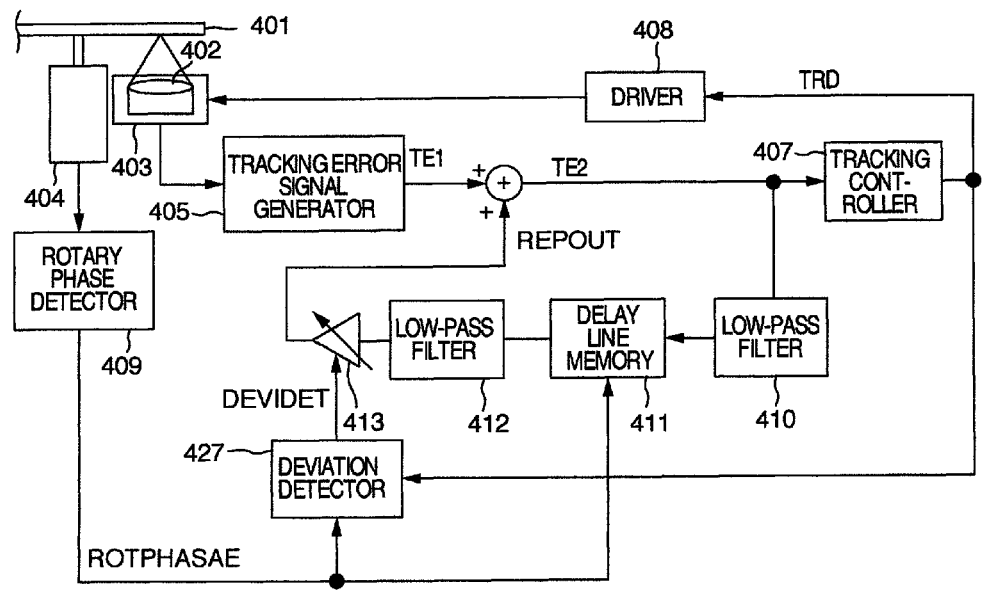
FIG. 33 is a block diagram showing an optical disk device in an eighth embodiment.

FIG. 33 shows an optical disk of the eighth embodiment in a block diagram.

In FIG. 33, the same constituent components as those of the first embodiment shown in FIG. 4 are assigned with the same reference numerals, and description thereof will be avoided.

Reference numeral 427 indicates a deviation detector. The detector 427 receives the signal TRD and information ROTPHASE to detect a deviation and then produces a deviation detection signal DEVIDET.

Figure 34:
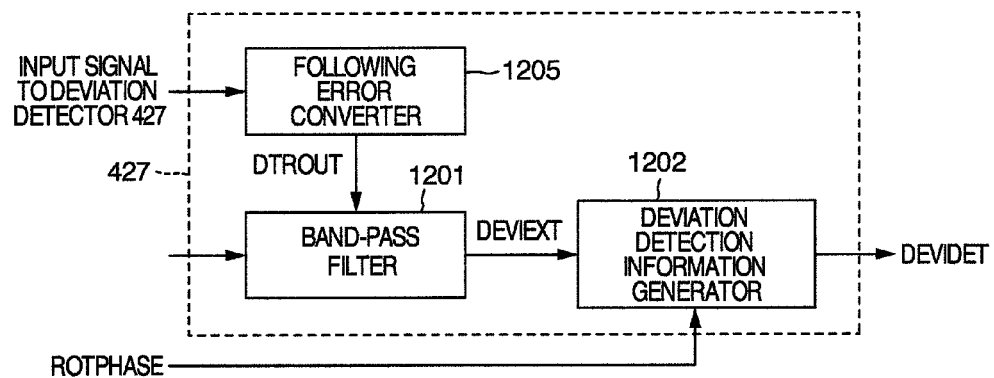
FIG. 34 is a block diagram showing a configuration of a deviation detector in the eighth embodiment.
Figure 35:
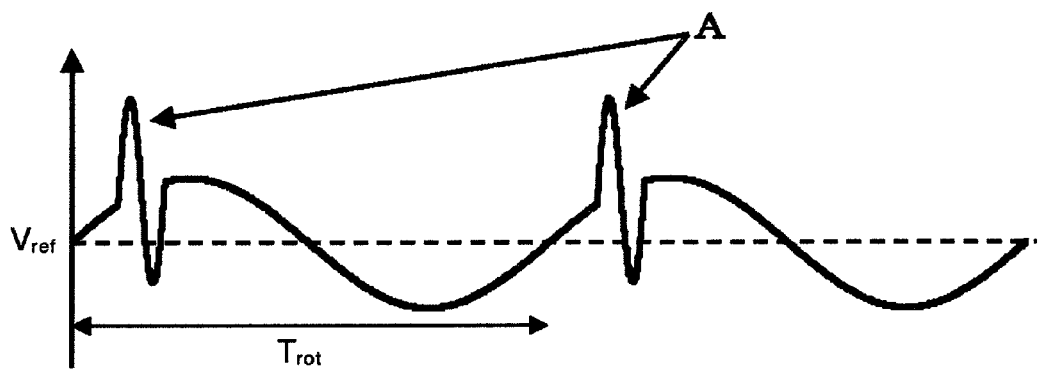
FIG. 35 is a waveform graph for explaining a deviation component in a servo error signal.
Figure 36A:
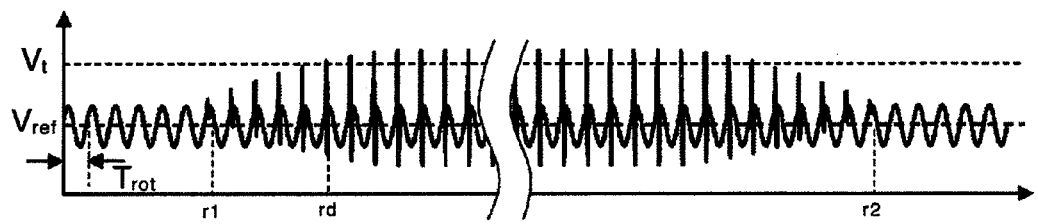
FIG. 36A is a graph showing waveforms when a radial area including a deviation is passed.
Figure 36B:
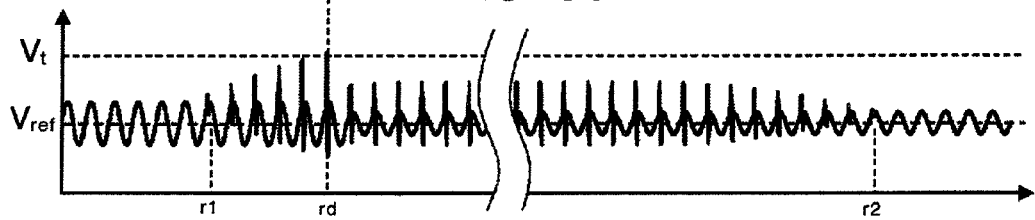
FIG. 36B is a graph showing waveforms when a radial area including a deviation is passed.
Figure 37:
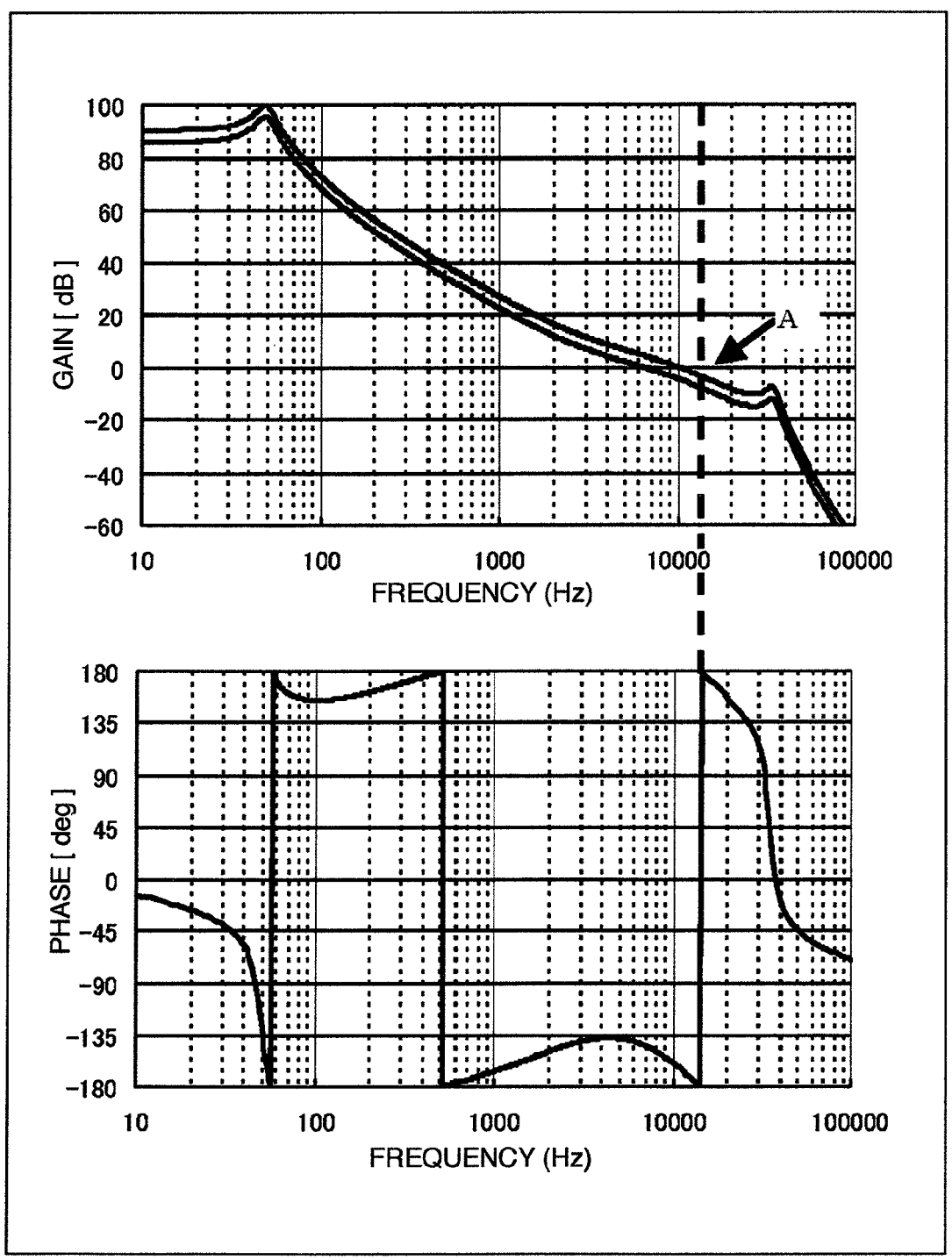
FIG. 37 is a diagram graphically showing an example of a Bode diagram of an open-loop transfer function of an optical disk device.

Referring to the block diagram of FIG. 34, description will be given in detail of the deviation detector 427. In FIG. 34, reference numerals 1201 and 1202 respectively indicate a band-pass filter and a deviation detection information generator. The filters 1201 and 1202 are substantially equal to those of the first embodiment, and description thereof will be avoided.

Reference numeral 1205 is a following error converter 1205, which has a predetermined filtering characteristic to produce a following error conversion signal (DTROUT).

In the eighth embodiment, the band-pass filter 1201 attenuates, for the DTROUT, a rotary period component, its second-order and third-order components, and a high-frequency noise component to produce a signal DEVIEXT.

The signal TRD is obtained when the signal TE2 passes the tracking controller 407 having the frequency characteristic shown in FIG. 9. Hence, for example, for a deviation component of 1 kHz and a deviation component of 3 kHz, even if these components have substantially equal amplitude when they are observed by use of the signal TE2, these components differ in amplitude from each other when they are observed by use of the signal TRD.

It is desirable that a deviation is detected by recognizing an event in which the following error becomes large. Hence, it is favorable to detect the deviation based on the signal TE2 converted as above.

The following error converter 1205 has an inverse characteristic of the characteristic shown in FIG. 9. In this situation, the signal DTROUT from the converter 1205 is equivalent to the signal TE2. That is, the signal DEVIDET in the eighth embodiment has a waveform equivalent to that of the signal DEVIDET of the first embodiment. In other words, the following error converter 1205 includes a filter having an inverse characteristic of the transfer characteristic from the signal TE2 to the signal TRD.

Due to the configuration above, even if the signal TRD is employed to detect a deviation, an advantage similar to that of the first embodiment is obtained.

The eighth embodiment requires a filter following error converter 1205 having an inverse characteristic of that of the tracking controller 407. On the other hand, in the configurations of the first to seventh embodiments, it is required to change the characteristic of, for example, the iterative learning control system immediately after the signal TE1. Hence, the sequence of the control elements is disadvantageously restricted. In a situation wherein the present invention is applied to a feedback control system which requires the signal TRD to conduct the iterative learning control, the configuration of the eighth embodiment is to be used.

Due to the above operation of the optical disk device of the eighth embodiment, it is possible that at detection of the start point of a deviation area, the servo characteristic is changed to increase the suppression degree for a deviation. The end point of the deviation area is detected while following a track with the servo characteristic having the increased suppression degree for a deviation, to thereby restore the servo characteristic to the steady-state characteristic. Hence, the following performance for the deviation can be improved.

In the first, second, and seventh embodiments, the value of the variable gain element 413 of the repetitive system is set to 0.1 in the steady state and 1 in the characteristic changeover state. However, other values may also be available. For example, the value of the variable gain element 413 may be set to 0.8 in the characteristic changeover state.

Also, in the first, second, and seventh embodiments, the variable gain element 413 is disposed in a stage after the second low-pass filter 412 in the repetitive system. However, the variable gain element 413 may be placed at any position in the iterative learning control loop. For example, the variable gain element 112 may be disposed at a position immediately before the low-pass filter 110, not after the low-pass filter 412. However, in the second embodiment, the threshold value to detect a deviation is changed according to necessity.

According to the iterative learning control of the embodiments described above, one rotation of the spindle motor 404 is divided by N to store the value of a signal. However, even when the iterative learning control employs more than one rotation of the motor 404 to store the value of each signal, the present invention is similarly applicable.

In the configuration of the eighth embodiment, the signal TRD is used to detect a deviation. However, it is not necessarily required to use the signal TRD. Any signal in the tracking controller 407 may be employed to detect a deviation. In FIG. 33, any signal in a stage after the stage of the signal TE2 may be used for this purpose. This is because the signal DTROUT can be generated from the signal by use of an inverse characteristic of a characteristic from the signal TE2 to the signal.

In the configuration of the eighth embodiment in contrast with that of the first embodiment, the signal TRD is used to detect a deviation. However, this is also applicable to an embodiment such as the fourth embodiment in which the servo gain is uniformly increased.

In the eighth embodiment, the following error converter 1205 has an inverse characteristic of the frequency characteristic of the tracking controller 407. However, it is not necessarily required that the characteristic is completely inverse frequency characteristic. It is only required that the characteristic is equivalent to the inverse characteristic in the frequency range in which a deviation is present.

In the embodiments described above, the deviation detection information generator detects a deviation by paying attention to whether or not the absolute value of an input signal thereto exceeds a threshold value $V_{th}$ continuously for at least a predetermined period of time $V_{time}$. However, this operation does not restrict the deviation detecting scheme. For example, it is also possible to detect a deviation by paying attention only to whether or not the absolute value of an input signal thereto exceeds a threshold value $V_{th2}$.

The configuration of the deviation detector according to the above embodiments includes a band-pass filter 1201. The filter 1201 produces the signal DEVIEXT by attenuating a rotary period component due to eccentricity and a high-frequency noise component to detect a deviation by use of the signal DEVIEXT. However, in general, the eccentric component in the signal TE1 has small amplitude. Hence, the deviation detector may be configured such that only the high-frequency noise component is attenuated by using a low-pass filter in place of the band-pass filter 1201.

In conjunction with the embodiments, description has been given of tracking control of an optical disk device. However, it is to be appreciated that the present invention is similarly applicable also to focusing control of an optical disk device. By disposing a deviation detector which detects, by use of a predetermined signal in a focusing servo loop, a deviation in a focusing direction of a track as a target of the following operation, the present invention is applicable also to the focusing control.

Moreover, the present invention is applicable also to servo controllers for apparatuses other than the optical disk device.

The present invention is not restricted by the embodiments, but various variations thereof are included in a scope of the present invention. For example, the embodiments have been described in detail only for easy understanding of the present invention. Hence, the present invention is not limited to a configuration including all constituent components described above. Part of any one of the embodiments may be replaced by a configuration of any other one embodiment. It is also possible to add a configuration of any one of the embodiments to a configuration of any other one embodiment. For part of any one of the embodiments, it is possible to conduct addition, deletion, and substitution by use of any other configuration.

In each of the configurations of the embodiments, part or all thereof may be implemented by hardware or may be realized by executing a program by a processor. Moreover, in the description of the present invention, control lines and information lines are presented according to necessity. That is, all control and information lines required for the produces are not shown. Actually, it may be considered that almost all constituent components are connected to each other.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A servo controller for generating a drive signal based on a servo error signal to conduct feedback control, comprising:

a characteristic change section for compensating a gain or a phase for the servo error signal according to a predetermined transfer function characteristic and changing the transfer function characteristic;

a drive signal generator for compensating a gain or a phase for an output signal from the characteristic change section to produce a drive signal; and a disturbance detector for detecting disturbance based on a predetermined signal, wherein the characteristic change section changes the transfer function characteristic according to a result of detection by the disturbance detector and the predetermined signal is a signal of a stage after the characteristic change section.

2. A servo controller according to claim 1, wherein the characteristic change section comprises:

a first characteristic compensation section for compensating a gain or a phase for the servo error signal;

a second characteristic compensation section for compensating a gain or a phase for the servo error signal; and a signal selector for receiving as inputs thereto an output signal from the first characteristic compensation section and an output signal from the second characteristic compensation section and conducting a changeover operation between the output signals according to whether or not the disturbance detector detects disturbance to thereby output a selected signal.

3. A servo controller according to claim 1, wherein the predetermined signal is the output signal from the characteristic change section.

4. A servo controller according to claim 1, wherein the disturbance detector comprises a filter having a inverse characteristic of a transfer characteristic from an output signal from a signal selector to the predetermined signal, the disturbance detector detecting the disturbance based on the predetermined signal having passed the filter.

5. A servo controller according to claim 1, wherein the disturbance detector detects the disturbance by measuring at least amplitude of the predetermined signal.

6. A servo controller according to claim 1, wherein:

the disturbance detector detects the disturbance by use of a result of comparison between at least amplitude of the predetermined signal and a predetermined threshold value; and the threshold value is independent of a characteristic of the characteristic change section and is a fixed value.

7. An optical disk device (FIG. 4) for emitting a laser beam onto an optical disk to record or to reproduce information thereon, comprising:

a disk rotating section for rotating the optical disk;

a rotary phase detector for detecting a rotary phase of the disk rotating section;

an optical detector for producing an electric signal corresponding to reflection light reflected from the optical disk;

a servo error signal generator for generating a servo error signal based on an output signal from the optical detector;

a characteristic change section for compensating a gain or a phase for the servo error signal by use of filters and changing a filter characteristic of the filters;

a drive signal generator for generating, based on an output signal from the characteristic change section, a drive signal to drive a servo actuator; and a track distortion detector for detecting distortion of a track on the optical disk based on a predetermined signal, wherein:

the characteristic change section changes, according to a result of detection by the track distortion detector, the filter characteristic to increase gain for a low-frequency band less than a predetermined frequency; and the predetermined signal is a signal in a stage after a stage of the output signal from the characteristic change section.

8. An optical disk device according to claim 7, wherein the predetermined signal is the output signal from the characteristic change section.

9. An optical disk device according to claim 7, wherein the track distortion detector comprises a filter having an inverse characteristic of a transfer characteristic from an output signal from the characteristic change section to the predetermined signal, the track distortion detector detecting the track distortion based on the predetermined signal having passed the filter.

10. An optical disk device according to claim 7, wherein the track distortion detector detects the track distortion by measuring at least amplitude of the predetermined signal.

11. An optical disk device according to claim 7, wherein:

the track distortion detector detects the track distortion by use of a result of comparison between at least amplitude of the predetermined signal and a predetermined threshold value; and the predetermined threshold value is independent of a characteristic of the characteristic change section and is a fixed value.

12. An optical disk device according to claim 7, wherein:

the characteristic change section comprises an iterative learning control section for suppressing disturbance having a frequency of an integral multiple of a rotary period, the characteristic change section increases, based on a result of detection by the track distortion detector, a degree of suppression of the iterative learning control section for the disturbance having a frequency of an integral multiple of a rotary period.

13. An optical disk device according to claim 7, wherein:

the characteristic change section comprises an iterative learning control section for suppressing disturbance having a frequency of an integral multiple of a rotary period;

the iterative learning control section comprises a variable gain element; and the characteristic change section increases, based on a result of detection by the track distortion detector, a value (K) of the variable gain element.

14. An optical disk device according to claim 7, wherein:

the characteristic change section comprises an iterative learning control section having suppression effect of suppression for disturbance having a frequency of an integral multiple of a rotary period;

the iterative learning control section comprises low-pass filters; and the characteristic change section increases, based on a result of the detection by the track distortion detector, a cut-off frequency of the low-pass filters.

15. An optical disk device according to claim 7, wherein:

the characteristic change section comprises a variable gain element for amplifying or attenuating amplitude of an input signal inputted thereto; and the characteristic change section increases, based on a result of detection by the track distortion detector, a value of the variable gain.

* * * * *